United States Patent
Green

(10) Patent No.: US 11,116,149 B2
(45) Date of Patent: Sep. 14, 2021

(54) PORTABLE GROWING SYSTEM

(71) Applicant: HYDROGARDEN LIMITED, Coventry (GB)

(72) Inventor: Stuart Green, Coventry (GB)

(73) Assignee: Hydrogarden Limited, Coventry (GB)

(*) Notice: Subject to any disclaimer, the term of this patent is extended or adjusted under 35 U.S.C. 154(b) by 102 days.

(21) Appl. No.: 16/300,945

(22) PCT Filed: May 12, 2017

(86) PCT No.: PCT/GB2017/000075
§ 371 (c)(1),
(2) Date: Nov. 12, 2018

(87) PCT Pub. No.: WO2017/194908
PCT Pub. Date: Nov. 16, 2017

(65) Prior Publication Data
US 2019/0090433 A1    Mar. 28, 2019

(30) Foreign Application Priority Data

May 12, 2016 (GB) .................................... 1608357
May 12, 2016 (GB) .................................... 1608362
May 12, 2016 (GB) .................................... 1608366

(51) Int. Cl.
*A01G 9/16* (2006.01)
*A01G 31/02* (2006.01)

(52) U.S. Cl.
CPC ................ *A01G 9/16* (2013.01); *A01G 31/02* (2013.01); *Y02A 40/25* (2018.01)

(58) Field of Classification Search
CPC .......... A01G 9/16; A01G 9/14; A01G 9/1407; A01G 9/1438; A01G 13/02; A01G 13/0231; A01G 9/00
See application file for complete search history.

(56) References Cited

U.S. PATENT DOCUMENTS 4,057,941 A * 11/1977 Schwartz ................ E04H 15/02
52/63
4,068,423 A * 1/1978 Marsh ...................... A01G 9/16
52/86

(Continued)

FOREIGN PATENT DOCUMENTS

CN      1820563 A      8/2006
CN    202773639 U      3/2013
(Continued)

OTHER PUBLICATIONS

International Search Report and Written Opinion for PCT/GB2017/000075, dated Sep. 4, 2017.
(Continued)

*Primary Examiner* — Kristen C Hayes

(57) ABSTRACT

A portable growing apparatus, comprising having a prefabricated, collapsible tent or greenhouse-like housing structure which, when constructed at the point of use, provides an enclosed growing area surrounded by one or more enclosing walls; and a growing system formed of a plurality of detachable parts for assembly at the point of use and for locating within the enclosed growing area of the collapsible housing structure.

13 Claims, 25 Drawing Sheets

(56) References Cited

U.S. PATENT DOCUMENTS

| | | | | |
|---|---|---|---|---|
| 5,101,593 | A * | 4/1992 | Bhatt | A01G 9/16 47/17 |
| 6,141,902 | A * | 11/2000 | Boice | A01G 9/16 47/17 |
| 6,618,988 | B2 * | 9/2003 | Williams | A01G 9/16 47/17 |
| 6,622,425 | B2 * | 9/2003 | Shepherd | A01G 9/1423 47/17 |
| 6,871,452 | B2 * | 3/2005 | Berg | E04H 15/44 52/63 |
| 9,545,059 | B2 * | 1/2017 | DeMerchant, Jr. | A01G 9/14 |
| 9,771,729 | B2 * | 9/2017 | Workman | E04H 15/56 |
| 10,206,336 | B2 * | 2/2019 | Herrick | A01G 9/16 |
| 2002/0059749 | A1 * | 5/2002 | Williams | A01G 9/16 47/17 |
| 2004/0206013 | A1 * | 10/2004 | Berg | A01G 9/16 52/63 |
| 2009/0031621 | A1 | 2/2009 | Kitagawa | |
| 2010/0236142 | A1 * | 9/2010 | Drewry | A01G 9/16 47/29.1 |
| 2012/0137578 | A1 | 6/2012 | Bradford et al. | |
| 2013/0247462 | A1 | 9/2013 | Leslie | |
| 2014/0083000 | A1 * | 3/2014 | DeMerchant, Jr. | A01G 9/14 47/17 |
| 2016/0198656 | A1 | 7/2016 | McNamara et al. | |
| 2018/0235156 | A1 * | 8/2018 | Blair | A01G 31/06 |

FOREIGN PATENT DOCUMENTS

| | | |
|---|---|---|
| CN | 205357367 U | 7/2016 |
| DE | 2455220 A1 | 5/1976 |
| GB | 2234147 A | 1/1991 |
| GB | 2525497 A | 10/2015 |
| JP | 2002-034337 A | 2/2002 |
| JP | 2002-051653 A | 2/2002 |
| JP | 2012-231724 A | 11/2012 |
| KR | 20120114551 A | 10/2012 |
| KR | 20120117088 A | 10/2012 |
| KR | 20150040434 A | 4/2015 |
| WO | 2008/115065 A1 | 9/2008 |
| WO | 2015/105426 A1 | 7/2015 |
| WO | 2015/140493 A1 | 9/2015 |
| WO | 2015/152206 A1 | 10/2015 |

OTHER PUBLICATIONS

Search Report for British Patent Application No. 1608357.8, dated Nov. 4, 2016.

Search Report for British Patent Application No. 1608362.8, dated Nov. 9, 2016.

Search Report for British Patent Application No. 1608366.9, dated Nov. 14, 2016.

* cited by examiner

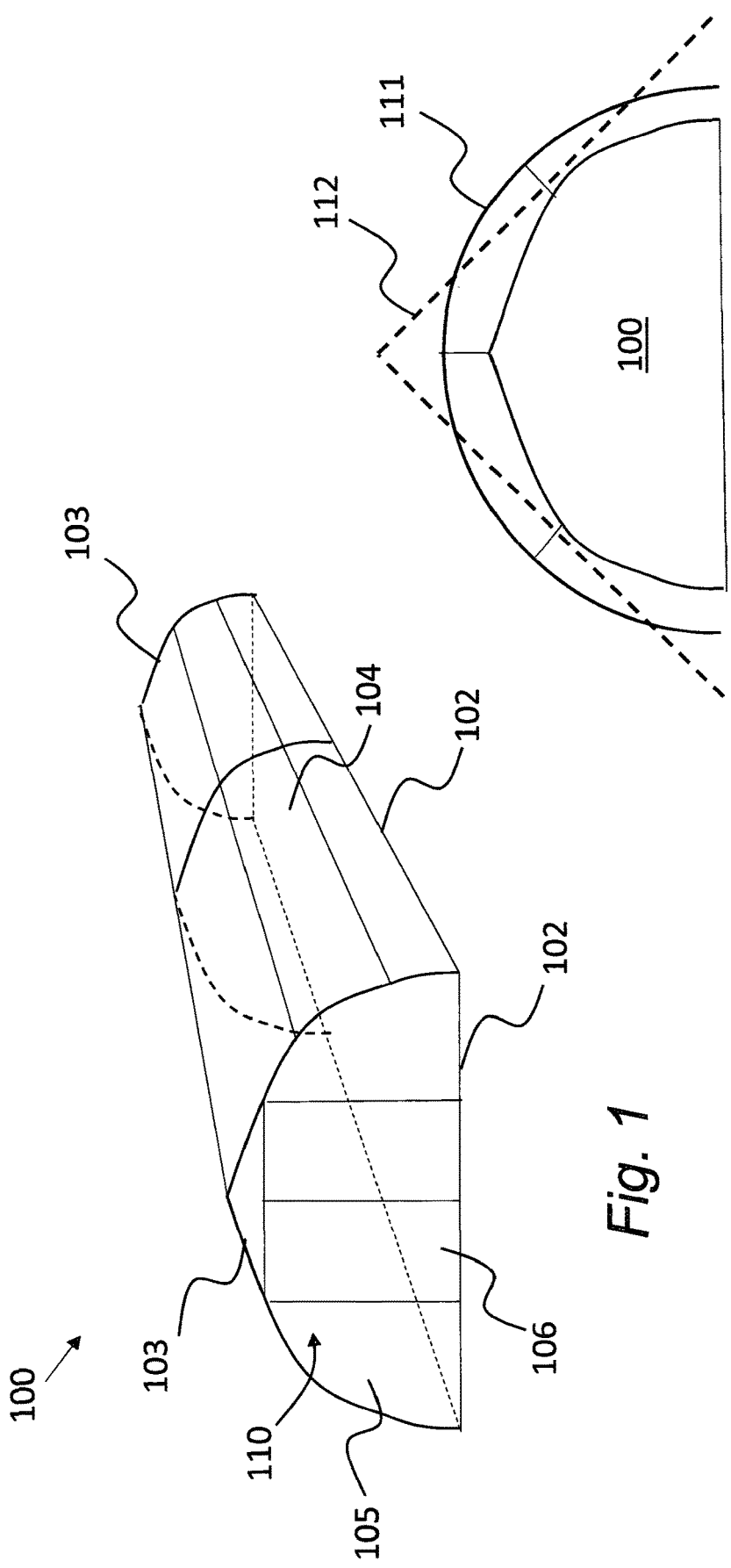

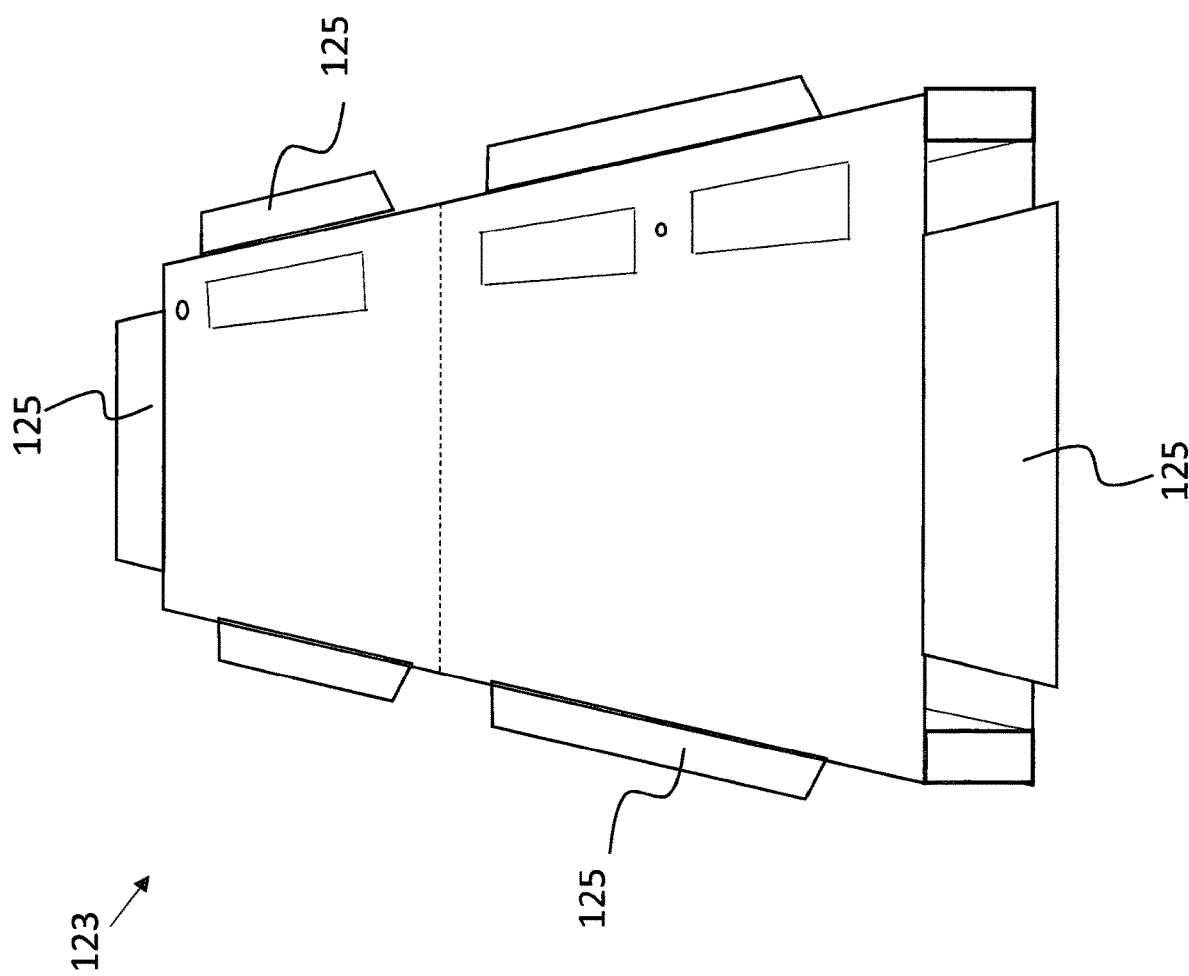

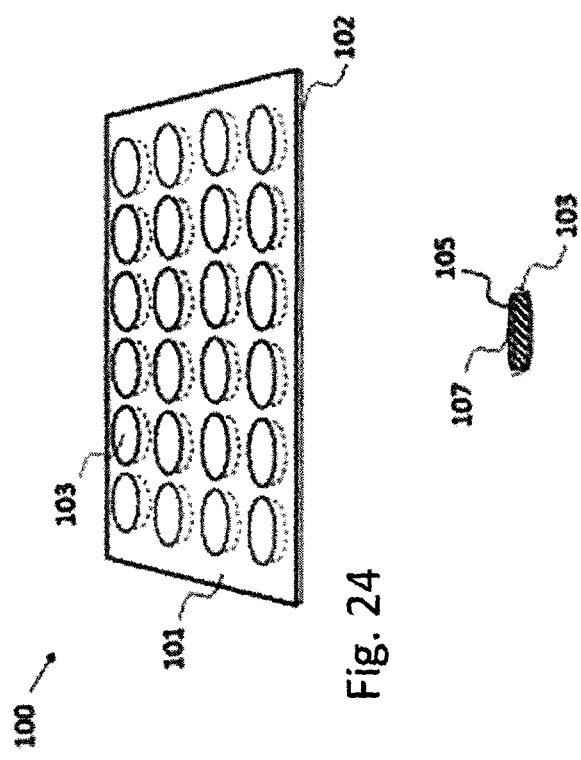

PORTABLE GROWING SYSTEM

CROSS-REFERENCE TO RELATED APPLICATION

This application is a U.S. National Stage Application of PCT/GB2017/000,075, filed May 12, 2017, which claims benefit of Application Nos. 1608357.8, 1608362.8 and 1608366.9, filed May 12, 2016 in Great Britain, which applications are hereby incorporated by reference. To the extent appropriate, a claim of priority is made to each of the above disclosed applications.

FIELD OF THE INVENTION

The present invention relates to a portable growing system, particularly one that comprises a pre-fabricated, collapsible structure for housing a growing system, for example a hydroponics growing system.

The present invention also relates to vertical tiered growing systems for inter alia growing plants, micro herbs or edible foliage. More especially, the present invention relates to vertical tiered growing system that is modular in structure with individual tiered sections movable thereby to reduce the footprint of the system to allow it to be accommodated in areas where space is limited.

The present invention also relates to a hydroponic growing method.

BACKGROUND OF THE INVENTION

The hydroponics industry is growing year on year. It is becoming increasingly common and indeed necessary for nations of the world to grow fresh produce locally to feed their populations. A common method of growing plants involves an NFT (Nutrient Film Technique) system. An NFT system is a recirculating hydroponic system that consists of growing channels or trays over which a nutrient solution is constantly pumped across, creating a nutrient film into which the roots grow. Plants are often started in stone wool cubes and placed on the growing channels. The solution is recirculated from a main tank. Other methods and apparatuses are known.

One such other method is known as "flood and drain" or "ebb and flow". The method involves placing plants onto a flood table (a bath-like structure having a base and side walls) and pumping a nutrient solution into the flood table to flood the plants, submerging the roots. The pump is turned-off and the solution drained away. This cycle is repeated periodically, often using a timer to control the length and period of the cycles automatically. As the plants grow, the number of floods is usually increased.

Large scale NFT systems require a considerable amount of land as plants are traditionally laid out in channels along a horizontal plane over a large area. In general, the greater the amount of produce required, the greater the area of the land needed to grow the produce. Consequently, urban areas rely on fresh plants and edible produce to be delivered from the rural, often distant, farming areas. The expanse of farming area required means that fresh produce is generally not grown on a commercial scale within urban areas and cities. This is particularly the case in built-up cities around the world were open space is limited and at a premium.

Restaurants within cities and urban areas require daily deliveries of fresh produce. Supermarkets also require regular large deliveries requiring vast transport networks and logistics.

Vertical tier NFT systems are known which allow fresh produce to be grown in vertical tiers of shelving. Such systems however have been found to have inflexible structures and have restrictive limitations on the amount of tiers, and hence produce, that can be grown within a given area. Walkways must be provided between each shelf tier to allow access to any plant growing within the assembly. This can easily double the size of the footprint area needed for such systems.

Moreover, should the framework of known systems need to be moved, all lighting and fluid systems required for the system must be disconnected. Consequently, it is not possible to move or re-position any parts of the framework during any plant growing cycle.

Applicant's patent application publication number WO2015140493 provides an improved vertical growing system for growing inter alia plants, which has a flexible modular structure to alleviate the spatial limitations of other systems and which allows sections of tiered shelving structure to be moved and re-positioned during, and without interfering with, the growing cycle. The term "growing system" is intended to include any system that provides water or other nutrient fluid and light to plants growing within the system. This includes NFT systems as well as flood and drain systems.

The term "plants" is intended to include edible leaves, such as lettuces and herbs.

However, there remains the problem of providing such growing systems to challenging locations, e.g. remote locations with little or no road access, including locations affected by drought or conflict.

It is therefore an aim of this invention to provide an improved and portable growing apparatus.

SUMMARY OF THE INVENTION

A first aspect of the invention provides a portable growing apparatus, comprising:
 a pre-fabricated, collapsible tent or greenhouse-like housing structure which, when constructed at the point of use, provides an enclosed growing area surrounded by one or more enclosing walls; and
 a growing system formed of a plurality of detachable parts for assembly at the point of use and for locating within the enclosed growing area of the collapsible housing structure.

The housing structure may comprise a framework comprising one or more rigid or relatively rigid frame sections; and one or more panels arranged in use to be connected to, and supported by, the framework at the point of use to provide the enclosing walls within which is defined the growing area. The housing structure may therefore be a tent, or tent-like, being of any reasonable shape and size so long as it is collapsible for transport and able to be constructed at the point of use. Similarly, the growing system is preferably formed of modular parts, easily put together at the point of use for placement within the growing area.

The structure may further comprise a shipping container within which the collapsible housing structure and the growing system is housed, the shipping container measuring no more than approximately 20'×8'×8.5'. Such shipping containers are generally helicopter transportable, therefore making it possible to ship the entire apparatus to the point of use by helicopter, if other transport mechanisms are not appropriate.

The apparatus may further comprise a pre-fabricated floor structure dimensioned to be housed within the enclosed growing area of the collapsible structure when constructed, which floor structure comprises a substantially flat floor surface having one or more openings or apertures for pipes to extend in use from the growing system above the floor structure to a location beneath the floor structure.

The floor structure may be a suspended floor structure, e.g. one that has a hollow region underneath, within which certain components of the growing system can locate. The suspended floor structure may be placed on the ground. A hole or recess can excavated so that the floor structure sits within or over this hole or recess, with the surrounding ground providing insulation from harsh weather conditions, e.g. heat, cold, wind to protect those components within or under the floor structure and allowing continual use.

The floor structure may comprise, beneath the floor surface, one or more insulated walls.

The floor structure may comprise, beneath the floor surface, one or more tanks for holding liquid.

The or each tank may be integrally formed with the floor structure.

The floor structure may comprise means for mounting one or more liquid pumps and/or a power supply.

The floor structure may comprise one or more rails on its upper surface for relative sliding or rolling movement of different section(s) of the growing system. This mechanism is described in WO2015140493 the entire contents of which are incorporated herein by reference.

The apparatus may further comprise one or more detachable rails for mounting between the walls of the collapsible structure, above ground level, and to which the growing system is mounted in use so as to require no ground support.

The growing system may be a vertical, tiered growing system having multiple sections, each being movable relative to one or more other sections by means of rollers, sliders or casters which locate on the rail(s).

A further aspect of the invention provides a portable growing apparatus, comprising:
  a pre-fabricated, collapsible tent-like structure having a plurality of walls which, which constructed at the point of use, define an enclosed interior area;
  a vertical growing system formed of detachable parts, for construction at the point of use and which, when constructed, is dimensioned to be enclosed within the interior area of the tent-like structure, the vertical growing system comprising (i) a plurality of tiered sections, each section being a framework for mounting multiple growing trays or growing channels, one above the other, (ii) a liquid source for supplying a liquid to each tiered section individually, and (iii) a power source for supplying electrical power to individual lighting sources associated with each tiered section.

The apparatus may further comprise one or more mounting rails for locating within the enclosed interior area, to which each tiered section is mounted in use so as to be movable along the rail(s) relative to other section(s).

The or each mounting rail may be configured to be connected above ground, closer to an upper wall/roof of the collapsible structure than the ground, from which each of the tiered sections in use hang.

The mounting rails may be provided on a pre-fabricated floor dimensioned to locate within the enclosed area.

The pre-fabricated floor may further comprise one or more channels or tanks provided beneath, each having an aperture through the floor for access thereto.

A further aspect of the invention provides method of providing a growing system, comprising:
  providing a pre-fabricated, collapsible tent-like structure, in collapsed form;
  providing a growing system formed of a plurality of detachable parts, in detached form;
  constructing the tent-like structure to provide an enclosed growing area; and
  constructing the growing system and locating same within the enclosed growing area.

The method may further comprise extracting ground material from within the enclosed area to provide a ground recess or hole, locating a floor structure over the recess or hole, locating the growing system on the floor structure, and providing beneath the floor structure one or more of a liquid drainage tank, liquid supply tank, drainage pump, supply pump and/or electrical power supply so that it is at least partially within the recess or hole.

The method may further comprise first transporting by helicopter the collapsible structure and the growing system in a helicopter-transportable shipping container to a point of use.

A further aspect of the invention provides a vertical tier growing system for plants, the system comprising at least one vertically tiered shelf section each having one or more arms extending upwardly therefrom and mounted to one or more rails located above the growing system, so that the or each section can be moved along the rail(s), the or each section having located thereon means to provide and direct liquid and lighting to plants growing on said section during use.

The or each arm may have a roller located at or near its distal end which in use mounts on top of a rail.

Two or more arms may be provided, each having a roller located at or near its distal end which in use mounts on top of a respective rail.

The or each arm may have a plurality of adjacent rollers at or near its distal end for mounting on top of the rail.

The or each rail may have a slot extending through its vertical plane, through which the or each arm extends, with the distal end of the or each arm projecting through the top of the rail(s) and carrying one or more rollers which mount on top of the rail.

The system may further comprise one or more floor or ground mounted rail(s) onto which a further roller or set of rollers mounted beneath the or each section locate.

The floor or ground mounted rail(s) may be in vertical alignment with the or each rail(s) above the section(s).

The system may further comprise a user-operable friction brake for selectively securing the section to the or each rail(s).

The roller or rollers may be associated with an electric motor which is controllable by means of a remote control unit to cause movement of a section along the rail(s).

A further aspect of the invention provides a growing system apparatus comprising:
  an enclosed area having a ceiling and a floor;
  one or more rails or tracks located in or beneath the ceiling, extending linearly from one end of the enclosed area to towards the other; and
  a vertical tier growing system, comprising plural side-by-side sections, the or each section having located thereon means to provide and direct liquid and lighting to plants growing on said section during use, and at least one upwardly extending arm carrying a roller or the like on or near the distal end which locates on the or each rail or track so as to permit movement along the rails or tracks relative to the or each other section.

A further aspect of the invention provides a hydronic growing method, comprising:
(i) depositing plant matter and a growth substrate within a plant tray which comprises an upper surface and one or more recesses for holding the plant matter;
(ii) placing the plant tray on a stacking tray having a base and one or more upwardly projecting walls dimensioned so as to extend above the plant tray's upper surface when it is located on the stacking tray;
(iii) repeating steps (i) and (ii) using second plant and stacking trays, and stacking the second stacking tray on top of the first stacking tray so that a gap is left between the upper surface of the first plant tray and the base of the second stacking tray;
(iv) storing said stacked trays for an initial stage growing period in which plant growth can extend into the gap between stacked trays; and
(v) unstacking the stacking trays and locating the first and second plant trays on one or more hydroponic flood table(s) for a second stage growing period.

The method may further comprise, subsequent to step (v), the step (vi) of flooding the or each flood table(s) with a volume of nutrient-containing liquid so that its level is above that of the plant trays' upper surface to water the plant matter and growth substrate, and then draining the flood table, as part of a second stage growing period.

The method may further comprise the step (vii) of repeating step (vi) for subsequent flood and drain cycles over the second stage growing period.

The method may further comprise, subsequent to step (vi) or claim (vii), placing each plant tray on a respective stacking tray and stacking the stacking trays one on top of the other.

Each plant tray may comprise plural, non-draining recesses sunken into the upper surface.

The growth substrate may be a layer of fibrous biodegradable material, e.g. a carpet.

Each stacking tray may comprise a base of greater area than that of the plant tray.

The or each wall of the stacking tray may project upwardly by more than twice the depth of the plant tray. The or each wall may project upwardly by more than three times the depth of the plant tray.

The or each wall of the stacking tray may be arranged to completely surround an internal base area within which the plant tray sits flat in use.

The or each wall of the stacking tray may have, at or near its upper edge, a surface shaped so as to receive the external base of another stacking tray in such a way as to limit lateral movement when stacked.

Step (v) may comprise locating the first and second plant trays on one or more hydroponic flood table(s) which are part of a vertical tiered flood and drain system.

A further aspect of the invention provides a hydroponic growing method, comprising:
(I) providing multiple plant trays, each plant tray comprising an upper surface and a plurality of sunken, non-draining recesses within which are received plant seeds or germinating plant seeds in or adjacent a substrate;
(II) moistening the substrate;
(III) placing each plant tray within a respective stacking tray which comprises a base larger than the plant tray and which has one or more surrounding walls which extend above the plant tray upper surface;
(IV) stacking the stacking trays one on top of the other and storing them for a growth period in which the plants grow into the gap left between the plant tray and the stacking tray stacked above it;
(V) subsequently unstacking the stacking trays, removing the plant trays and locating them on a flood table of a flood and drain system which periodically floods the flood table with nutrified liquid to a level just above that of the plant trays before draining said liquid, promoting further growth.

A further aspect of the invention provides a stacking tray configured for use in the method according to any preceding definition, comprising a base having one or more upwardly projecting walls of greater height than a plant tray it is configured to hold.

The stacking tray may have a non-draining base.

The stacking tray may have at or near the upper periphery of the wall(s) a shaped part dimensioned and arranged to receive the base of another stacking tray to limit its lateral movement when stacked.

A further aspect of the invention provides apparatus configured for use in the method according to any preceding definition, comprising a plant tray having a plurality of recesses beneath an upper surface, and a stacking tray comprising a base of greater area than that of the plant tray with one or more upwardly projecting walls of greater height than the depth of the plant tray, so that there is a left a gap been the respective upper surfaces when the plant tray is located within the stacking tray.

BRIEF DESCRIPTION OF THE DRAWINGS

The invention will now be described, by way of non-limiting example, with reference to the accompanying drawings, in which:

FIG. 1 is a perspective view of a collapsible and portable enclosure forming part of a preferred embodiment of the invention;

FIG. 2 is a side view of the FIG. 1 enclosure, with different exoskeleton frame members, which are optional;

FIG. 5 is a perspective view of a second example floor system which may form part of the preferred embodiment;

FIG. 24 is a perspective view of a plant tray for use in a method according to the invention;

FIG. 25 is a side-sectional view of a recess of the FIG. 24 plant tray;

DETAILED DESCRIPTION OF PREFERRED EMBODIMENTS

Figure 4:
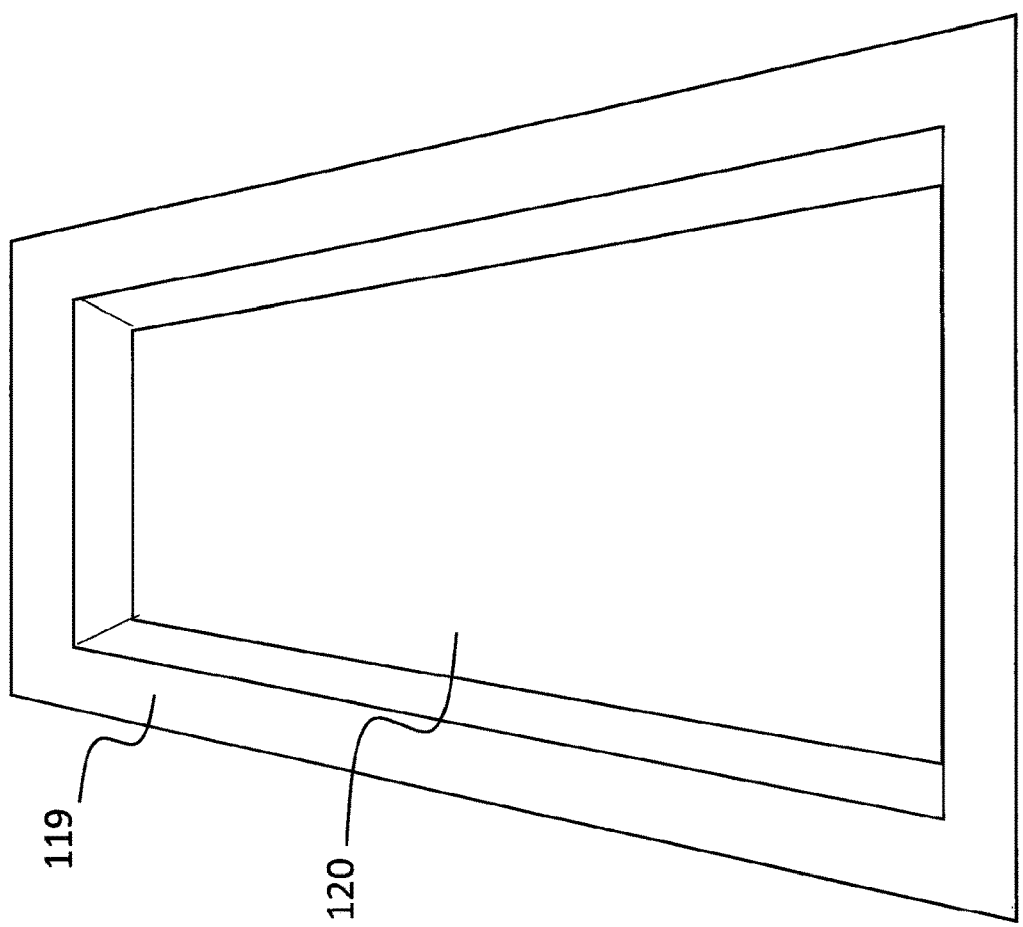
FIG. 4 is a perspective view of an enclosed region within the enclosure, including an excavated hole into which the FIG. 3 floor system can be received.

Embodiments herein relate to a portable hydroponics growing apparatus comprising a collapsible tent-like structure and a modular growing system for placement within the tent-like structure. The two parts are provided in collapsed form for transportation within a helicopter-transportable shipping container having the approximate dimensions of, for example, no more than 20'×8'×8.5' enabling easy storage and transportation to hard-to-reach areas for construction on-site and subsequent use. Other container dimensions may be appropriate.

Referring to FIG. 1, a collapsible tent-like structure 100 is shown, in the form of a half-tube greenhouse formed of relatively rigid poles, including at least four ground frame poles 102, and a plurality of more flexible roofing poles 103 which flex into an approximate semi-circular shape to provide a half-pipe structure. The poles 102, 103 interconnect using known attachment connectors which receive the ends of the poles in the appropriate orientation. This provides a basic framework. Over the framework of poles 102, 103 are mounted one or more fabric or plastic sheets 104, which are clamped to the framework using any known means, e.g. adhering, clamping or simply laying over the complete framework and pegging down at ground level in the manner of a conventional sheet. More sheets 104 may be replaced by more rigid plastic or glass panels, and they may be opaque or transparent, or part way between the two. An end wall 105 is provided with a door-like opening within which is provided a modular sliding door structure 106 to allow user entry and exit to the enclosed area created within the tent-like structure 100.

The tent-like structure 100 can be of any reasonable shape or size. It need not be a half-tube; it can, for example, be more house-shaped, or a dome.

Further, in some embodiments, an external exoskeleton can be provided to provide additional strength to the tent-like structure 100. For example, in FIG. 2, one or more flexible poles 111, 112 (alternative arrangements) can overlie the basic structure 100 and are connected to it using cables or ropes under tension, or other spars, to maintain the structure's shape and form.

The tent-like structure 100, when collapsed, is stored in flat form in the manner of a conventional tent, e.g. with the flexible panels 104 of the 'skin' folded up and the poles 102, 103 of the framework stored alongside, taking up very little space. Similarly, the door panels 106 can be stored flat in a shipping container.

The growing system which is supplied with the tent-like structure 100 can be of any reasonable type, provided it can be provided in deconstructed form and assembled at the point of use. For the purposes of embodiments to follow, we describe the use of a vertical tiered NFT growing system, as described in WO2015140493, but which is provided in modular form for assembly on-site.

The enclosed area 110 within the tent-like structure 100, within the bounds of the rectangular frame poles 102, and beneath the walls 104, is provided for locating the growing system.

A suspended floor system is provided for locating on or in the the ground within the enclosed area. The primary purpose of the floor system is not only to provide a relatively flat surface for the growing system to locate on, and for users to walk over, but also to provide a protected area beneath for certain components of the growing system to be stored. The suspended floor system is also provided in portable weight and dimensions, and can be provided in deconstructed form for assembly on-site.

Figure 3:
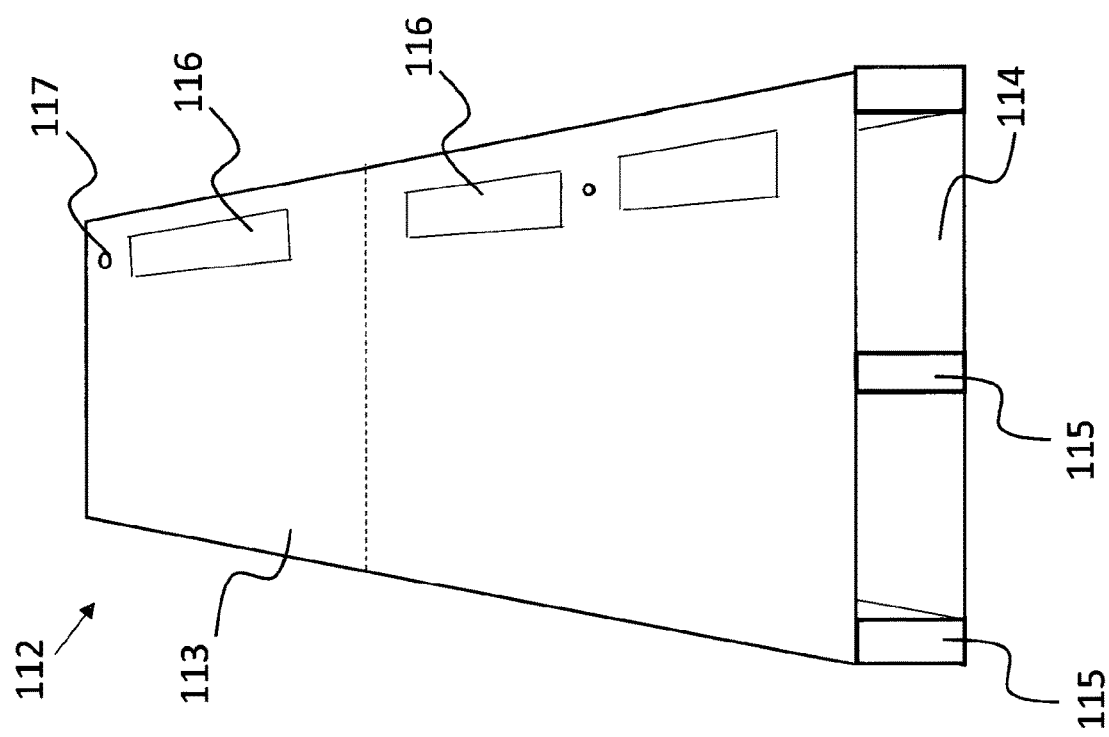
FIG. 3 is a perspective view of a first example floor system forming part of the preferred embodiment.

FIG. 3 shows one embodiment of a floor system 112, comprising upper and lower panels 113, 114 interconnected by joists 115 to define a hollow box-like interior. The upper and lower panels 113, 114 can be formed of singular parts, or multiple parts, e.g. like floor boards or panels. The various parts 113, 114, 115 can be connected together using screws, rivets or nails, also supplied. The floor system 112 may even be provided as a single, constructed unit, provided it remains portable.

The upper panel 113 has one or more apertures 116, which may or may not be covered by removable panels, which allow access to certain components stored within the interior of the floor system 112. Such components may include liquid storage tank(s), liquid drainage tank(s), liquid troughs, pump(s), electrical power supplies, e.g. batteries, etc. Apertures 117 may be provided for pipework which extends between such components and relevant parts of the growing system above the upper panel 113.

In locating said components of the growing system within the interior of the floor system 112, protection is provided from, amongst other things, external effects such as the weather. Certain high and low temperatures, and wind conditions, may adversely affect the proper functioning of the components, for example. A certain amount of the interior of the floor system 112 may be lagged with insulating material, and/or insulating walls around the perimeter of the floor system may be provided.

Certain components which interact with the growing system, e.g. liquid supply tank(s) and liquid drainage tank(s), liquid troughs, pumps and/or batteries, or attachments means therefor, can be formed integrally with the floor structure 112 in some embodiments.

It is preferred, but not essential, that the floor system 112 be at least partially submerged within the ground on-site. More particularly, as shown in FIG. 4, a ground region 119 within the enclosed area under the tent-like structure 100 may be excavated, e.g. by digging into soil or sand, to provide a hole 120 within which the suspended floor structure locates in use. This has advantages in that the components described above are protected by the natural insulating effect of the ground, which remains relatively stable and is not (or less) affected by wind or radiation from the sun.

An alternative embodiment floor system 123 may comprise a flange or extension parts 125 on the upper surface which supports the floor system using the surrounding ground perimeter with the components located in the hole 120. FIG. 5 demonstrates.

Further insulation may or may not be needed within the floor system 112, 123 if partially submerged into the ground.

Figure 6:
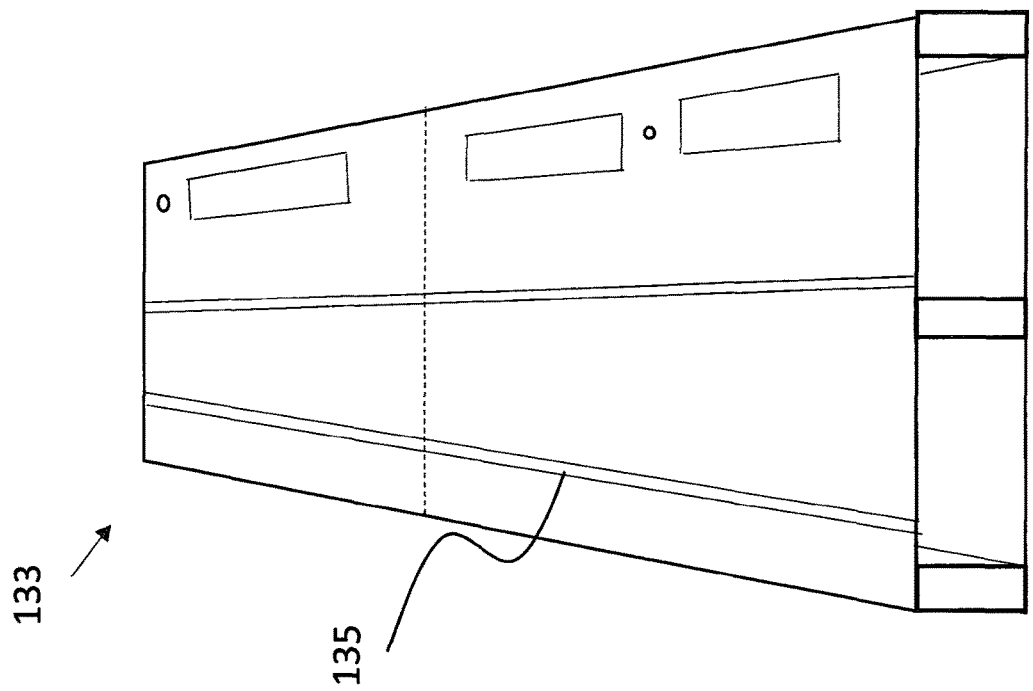
FIG. 6 is a perspective view of a third example floor system, which may form part of the preferred embodiment.

In further embodiments, for which see FIG. 6, the floor system 133 may comprise one or more rails 135 extending over the entire, or majority of the length, of the upper floor surface, providing a track over which the growing system, to be described below, is movable to provide walkway regions or similar access to different sections of the growing system. The rails 135 may be integrally formed on the upper floor surface, or are securable to the surface at the point of assembly.

A floor system for use in the present embodiments may not require a box-like structure, instead comprising only an upper panel with aperture(s) extending to components beneath, which may or may not be formed as part of the floor system.

Figure 7:
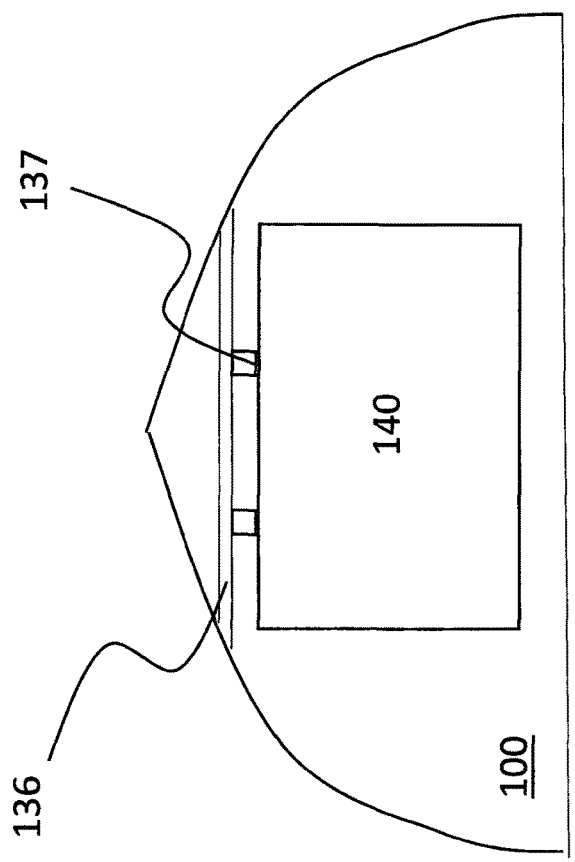
FIG. 7 is a side view of the FIG. 1 enclosure, incorporating a pair of top rails from which a growing system can be suspended.

In further embodiments, the growing system, to be described below, may hang from the upper part of the tent-like structure 100, as indicated in FIG. 7. Here, a cross beam 136 connects between sides of the tent-like structure 100, there being one near either end of the structure, and possibly one intermediate the two ends. Extending transverse to the cross beams 136 is/are one or more rails 137 extending the majority of the length of the structure 100. The growing system to be described below is adapted to have vertical arms extending upwardly which locate over the top of the rail(s) 137 so that the growing system hangs beneath. Optionally, the sections of the growing system can move relative to one another by means of sliding or rolling movement over the rails 137 to provide access to the different sections.

An example growing system, particularly a vertical tiered growing system, for placement within the tent-like structure 100 described above will now be described. It will be appreciated that the growing system is modular in structure, it being possible to provide said system in disassembled form for assembly in-site, following transportation.

Embodiments herein first describe use of a vertical tiered growing system as outlined in WO2015140493, which is useful for understanding the invention to be described later on.

Figure 8:
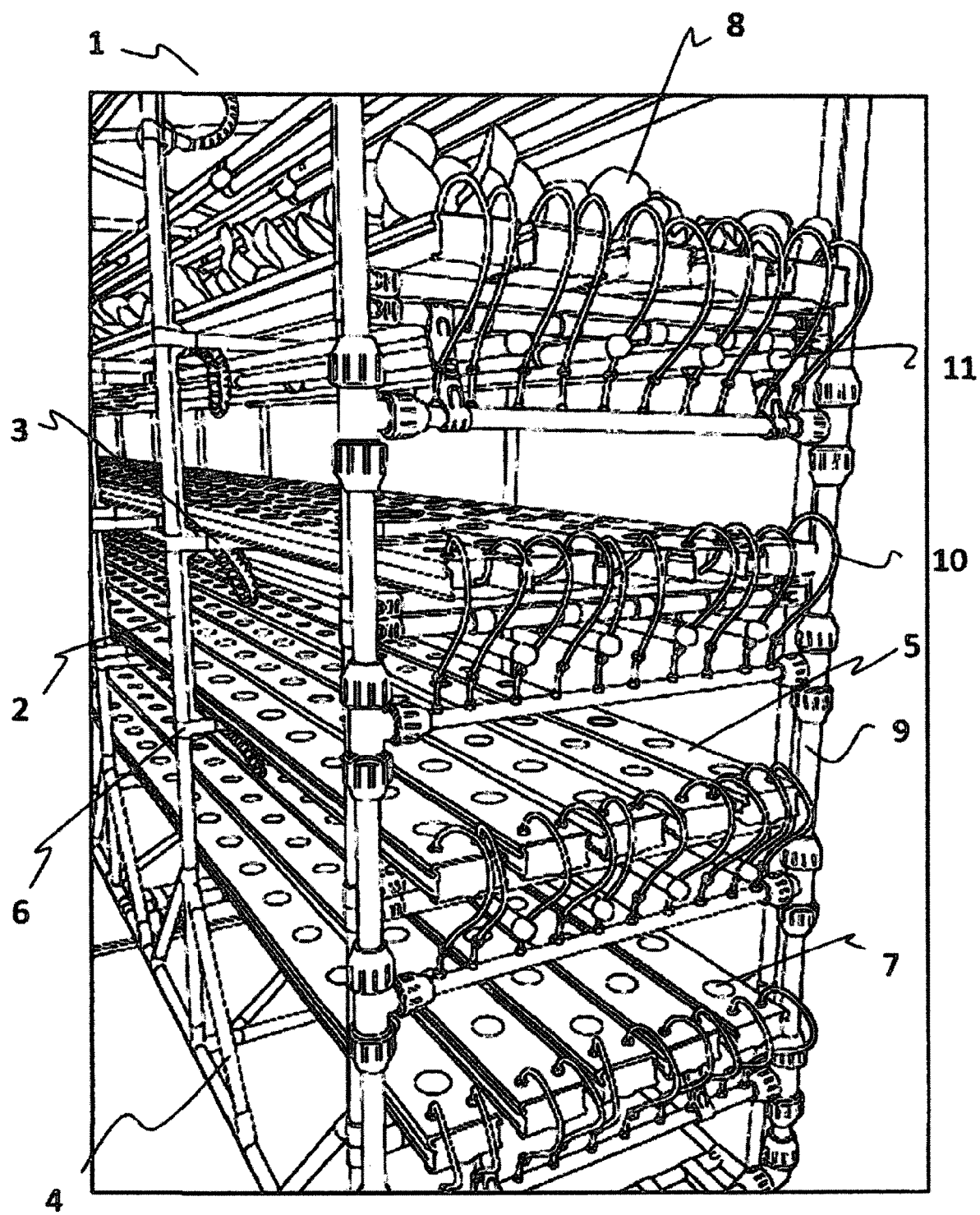
FIG. 8 is a perspective view of a vertical tiered section of a vertical growing system forming part of the preferred embodiment.

FIG. 8 illustrates an assembled tiered section 1 of a vertical tiered growing system, in this case an NFT system. The overall system includes a plurality of such sections. The section 1 comprises a framework of interconnecting vertical and horizontal beams (2 and 3 respectively), which are separately supplied for assembly on-site, or can be supplied partially or fully-assembled depending on the space in the storage container. Angled beams 4 are provided at the base to provide strength to the base of the framework. A tiered array of elongate plant trays 5 extend longitudinally along the frame work resting across the horizontal beams 3.

The framework beams 2, 3 are constructed from aluminium or other suitable strong but lightweight material. Plastics material can be employed.

Figure 9:
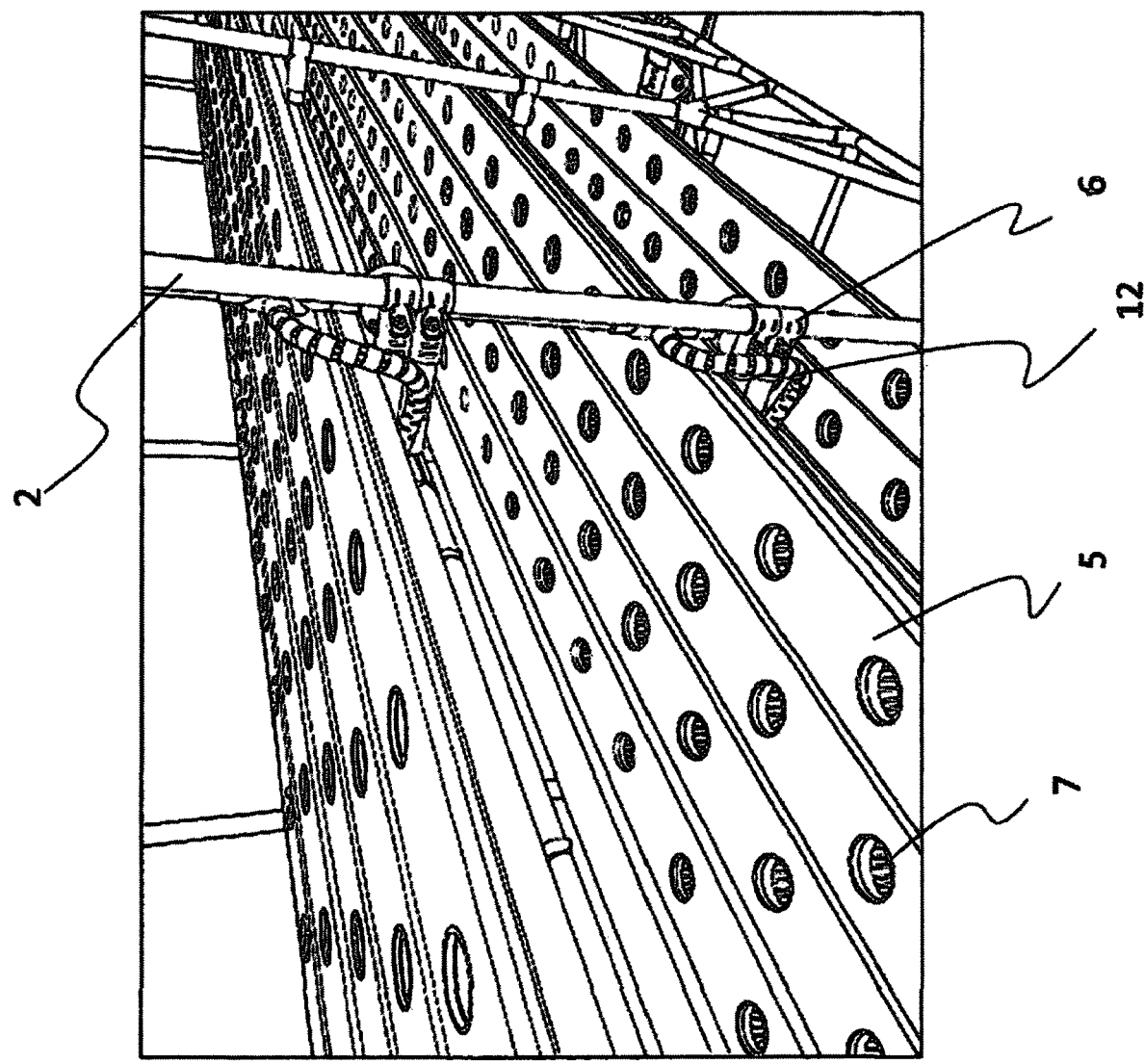
FIG. 9 is a close-up view of part of tiered section of FIG. 8.

As can be seen in FIG. 9, the horizontal beams 3 are connected to the vertical beams 2 through jointed clamps 6, the height of which can be altered to lower or heighten any tier level within the section 1 without having to deconstruct the entire framework.

Each plant tray 5 is generally made from plastic and has a hollow rectangular form. Apertures 7 are provided uniformly along each tray 5 in which are received plant roots or seedlings which grow into plants such as, for example in the case illustrated in the top tier of FIG. 12, lettuce. In use, a flow of nutrient is directed into and along each tray 5.

One end of the section (shown in FIG. 9) has a secondary frame of pipe work 9. Tubing 10 links the end of each tray 5 with the pipe work 9 to provide a closed system through which nutrient can flow between the trays 5 and the pipe work 9 for recirculation across the tiers of trays 5.

Artificial light tubes 11 and respective electrical fittings are provided, for connecting to the frame work such that they extend above, and generally parallel to, each tray 5. The artificial light may be generated from, for example, LEDs. The light tubes 11 are clamped to, and extend downwardly from, the horizontal beams 3 of the framework. As can be seen in FIG. 9, the electrical connection 12 to each light tube 11, linking the light tube 11 to a power source remote from the section, is flexible such that the power link remains intact and connected when the height of any shelf within the section 1 is adjusted. All electrical connections 12 are provided in modular form, for interconnection to the appropriate other connections using standard plug and socket connectors. In an alternative construction the light tubes may extend across the lateral axis of the framework, perpendicular to the trays 5. Under required circumstances, this may reduce the dimensions of the overall structure making it more compact. It may also reduce the number of lighting units required thereby reducing installation and running costs.

Figure 10:
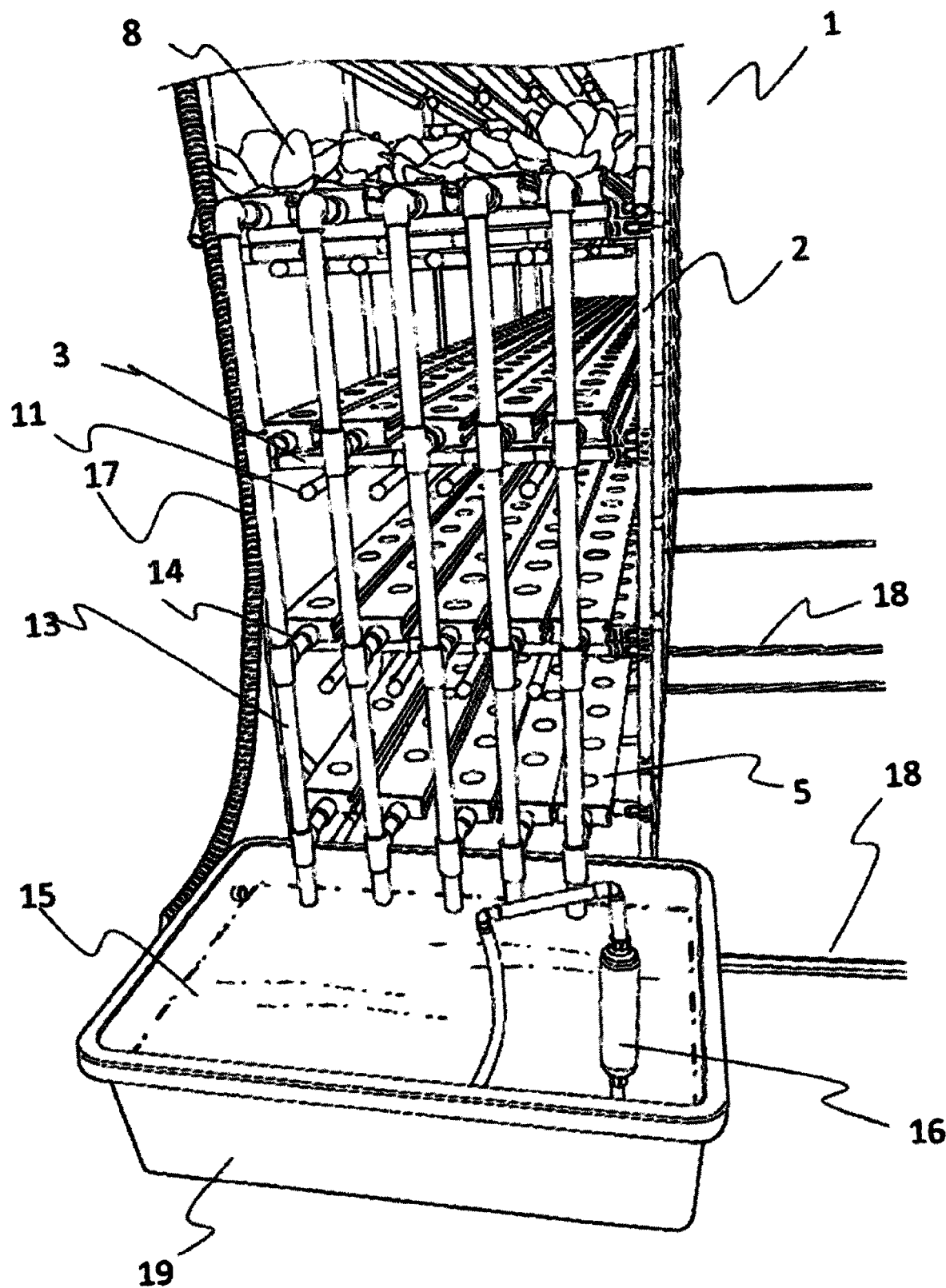
FIG. 10 is an end view of the tiered section of FIG. 8.

The other end of the tiered section 1 is illustrated in FIG. 10. Drainage pipe work 13 is connected to this end of the section 1. The drainage pipe work 13 has a plurality of outlet pipes 14 connected in turn to the end of each tray 5.

Once assembled, the trays 5 extend across each tier of the section 1 at a slight angle such that they extend slightly downwardly towards the end of the section with the drainage pipe work 13 (i.e. the end shown in FIG. 10). Consequently excess nutrient flows along to the trays 5 into the drainage pipe work 13 to be dispensed into a drainage tank 15.

Figure 12:
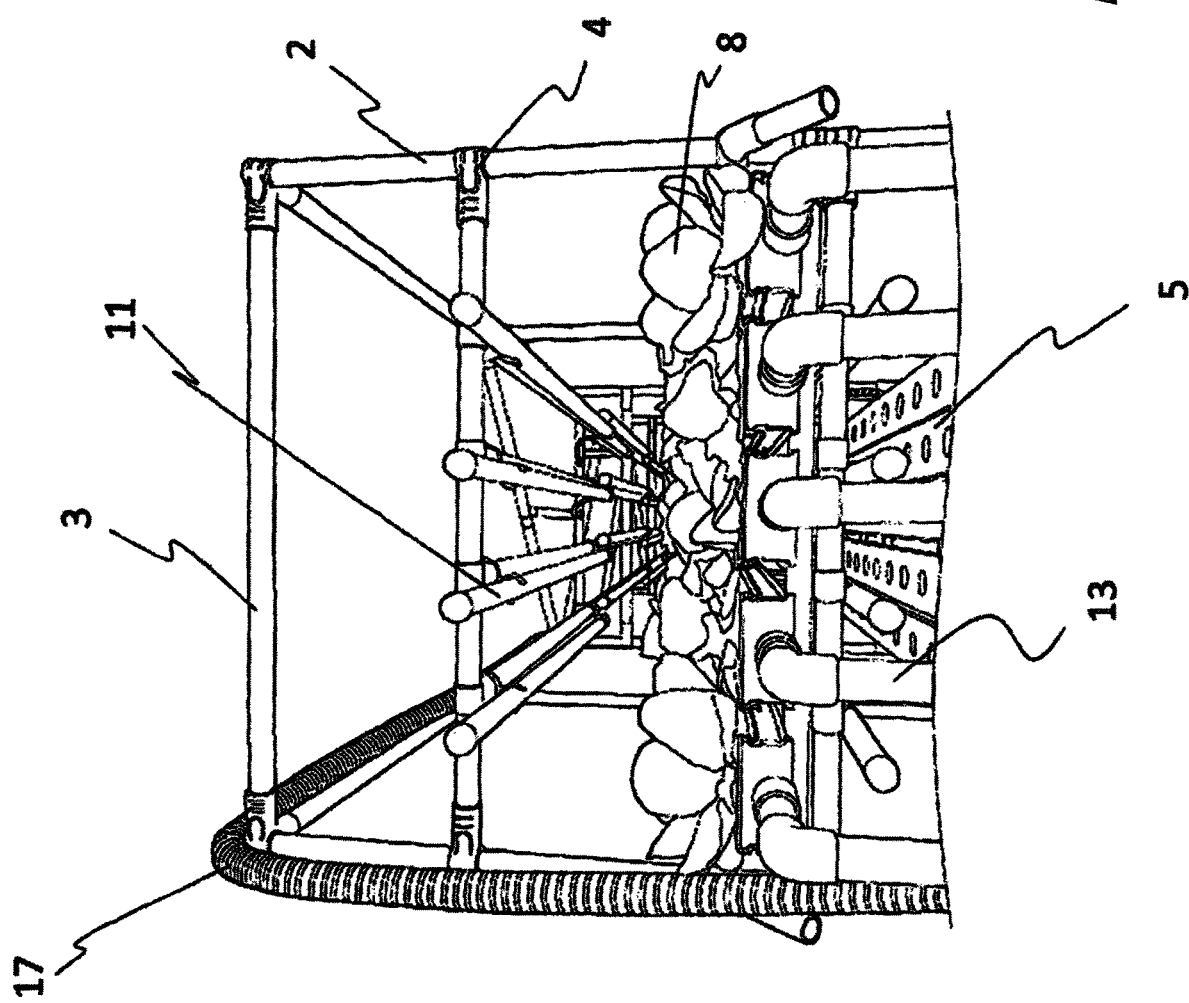
FIG. 12 is a close-up view of the top part of the tiered section of FIG. 8.

The drainage tank 15 is preferably housed within the floor system 112, 123, under its upper surface, and includes a pump 16 to pump nutrient back through tubing 17 and back into the trays 5 for recirculation (see FIG. 12). The drainage tank can be an integral part of the floor system 112, 123, beneath one of its apertures, or can be provided as a separate component for fixing inside the floor system.

As can be seen in FIG. 10, the system is arranged in this case to locate onto a track assembly 18 (refer to FIG. 6 above) which is secured to the floor system 112, 123. Only part of the track assembly 18 is shown in FIG. 10. The entire track 18 has a grid like form allowing individual sections to be moved sideways along the grid towards or away from each other.

The track 18 extends across substantially the entire base footprint of the system. In practice a number of tiered sections 1 are located on the track assembly 18 and each section is movable along the track 18 to alter their position relative to each other. This allows a path to be opened between any two sections 1 to allow access the plants in any section 1 where necessary. When access is no longer required to the side of a particular section 1, the neighbouring section can be moved across the track assembly 18 towards and against its neighbour thereby closing the gap whilst at the same time opening up path between another section 1 and its neighbour.

The fact that each section 1 is individually movable along the track assembly 18 means that the overall footprint area of the track for the entire system (including a number of sections) only needs to incorporate a single path width thereby significantly increasing the number of the tiered sections 1, and hence the grow able area within the system, within any defined location.

Figure 15:
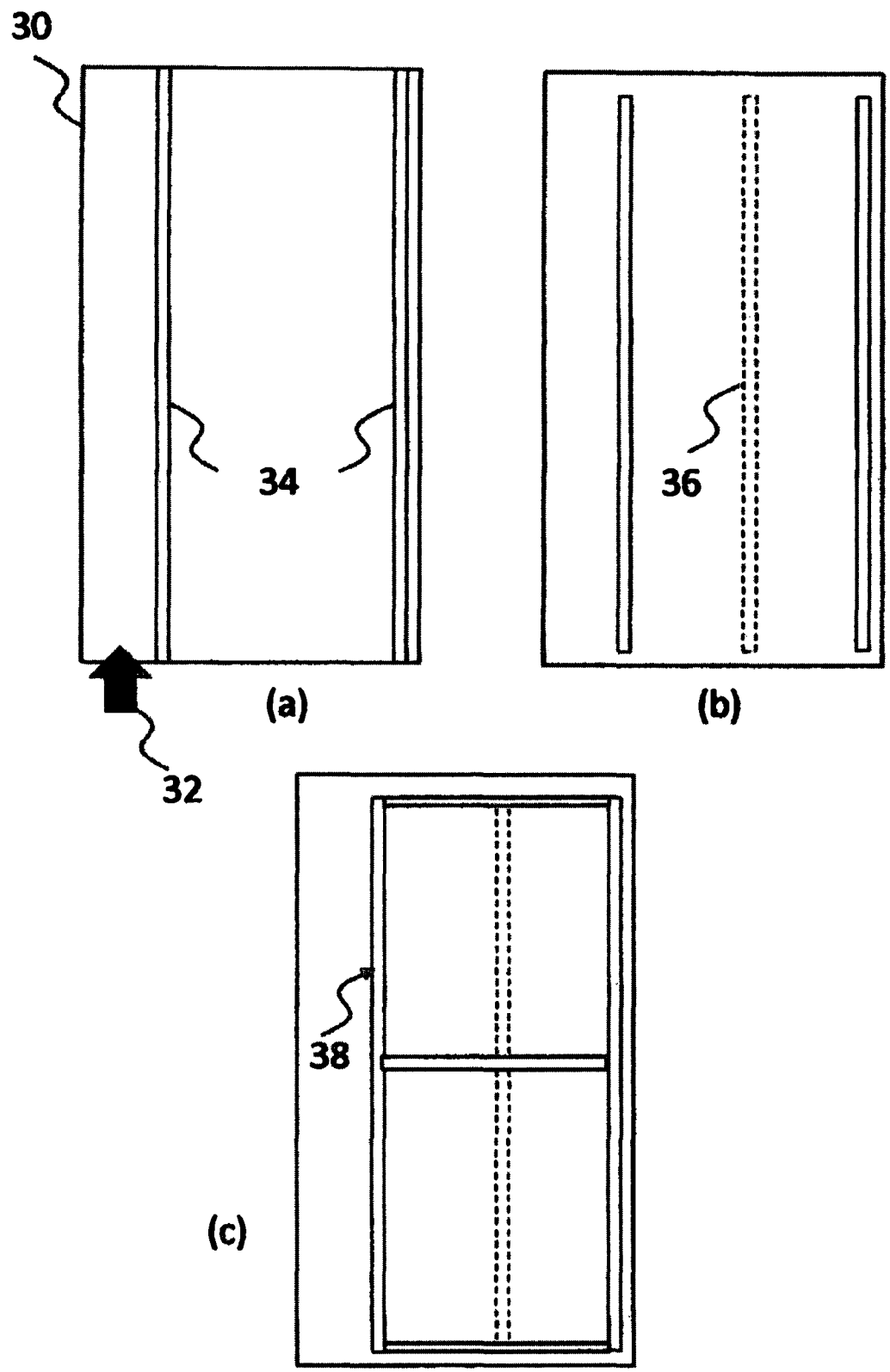
FIGS. 15(*a*) to (*c*) are schematic illustrations of tracks of for placement on the floor structure, in plan view.

Referring to FIG. 15(*a*), which is a plan view of the floor system, in some embodiments the track may comprise first and second parallel rails 34, spaced apart. Each section 1 (not shown in FIG. 15) is configured to slide or roll over the rails by respective spaced-apart sets of wheels, casters, rollers or sliders. A handle may be provided on the end of each section 1 to assist the movement. FIG. 15(*b*) shows that the track may comprise one or more additional rails 36. FIG. 15(*c*) shows a grid-like system 38 of rails, including one or more rails transverse to the longitudinal rails shown in FIGS. 15(*a*) and (*b*) for stability in terms of preventing the rails moving towards or away from each other.

Figure 16:
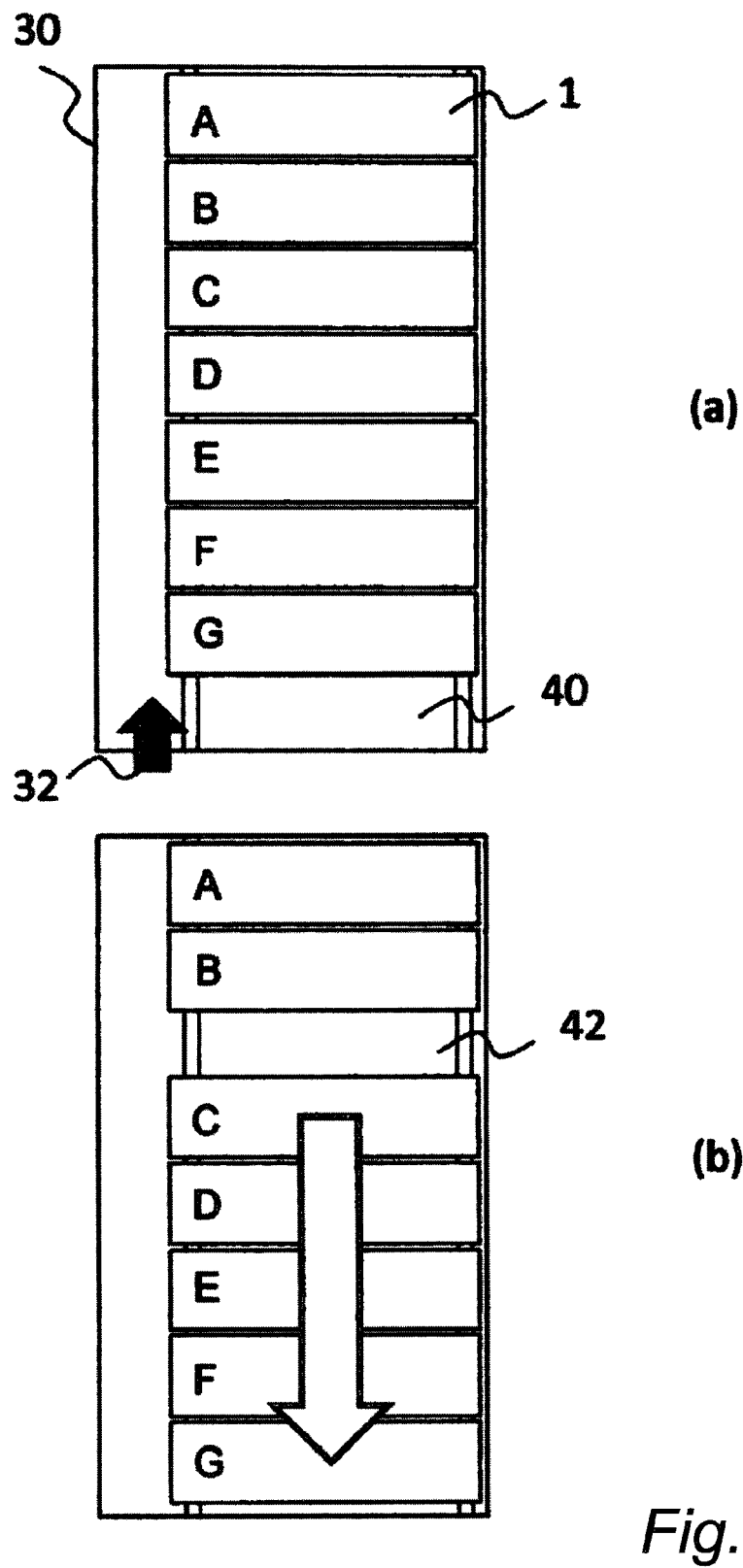
FIGS. 16(a) and (b) are schematic illustrations of how the sections can be moved to form paths therebetween.

The rails of the track can be of any form, e.g. cross-sectional profile. FIGS. 16(*a*) and 16(*b*) show in schematic view how the overall footprint area of the enclosed growing area can be minimised, by using the aforementioned track system. In FIG. 16(*a*) the space 40 represents both an access path for the adjacent section 1(G), and also a void into which said section (G) can be moved to provide access to the next section (F). It follows that multiple sections 1 can be moved as required, and FIG. 16(*b*) shows how movement of multiple sections (C, D, E, F, G) along the track rails creates a new path 42 for access to the adjacent sections (B, C).

Furthermore, the fact that individual lighting and water assemblies supporting plant growth on each section 1 are carried, when assembled, on that section 1 itself means that the section 1 can be moved sideways along the track 18, e.g. as indicated in FIG. 16, during a plant growing cycle without requiring disconnection of the lighting or nutrient systems which would otherwise disrupt and adversely affect growth of the plants. Moreover, each individual lighting and nutrient fluid assemblies are connected to a centralized source with flexible linkages which are able to accommodate an increase or decrease in length as the section 1 is moved towards or further away from the source. The centralised power source and warer/nutrient storage (neither shown) feeding the overall system may, for example be located in within the roof structure of the building within which the system is installed and would be connected to each section 1 through individual flexible linkages extending downwardly from the source for connection to the appropriate section.

In an alternative embodiment (not shown) each section may carry its own power source, such as a battery, and a storage tank for nutrient fluid.

Figure 11:
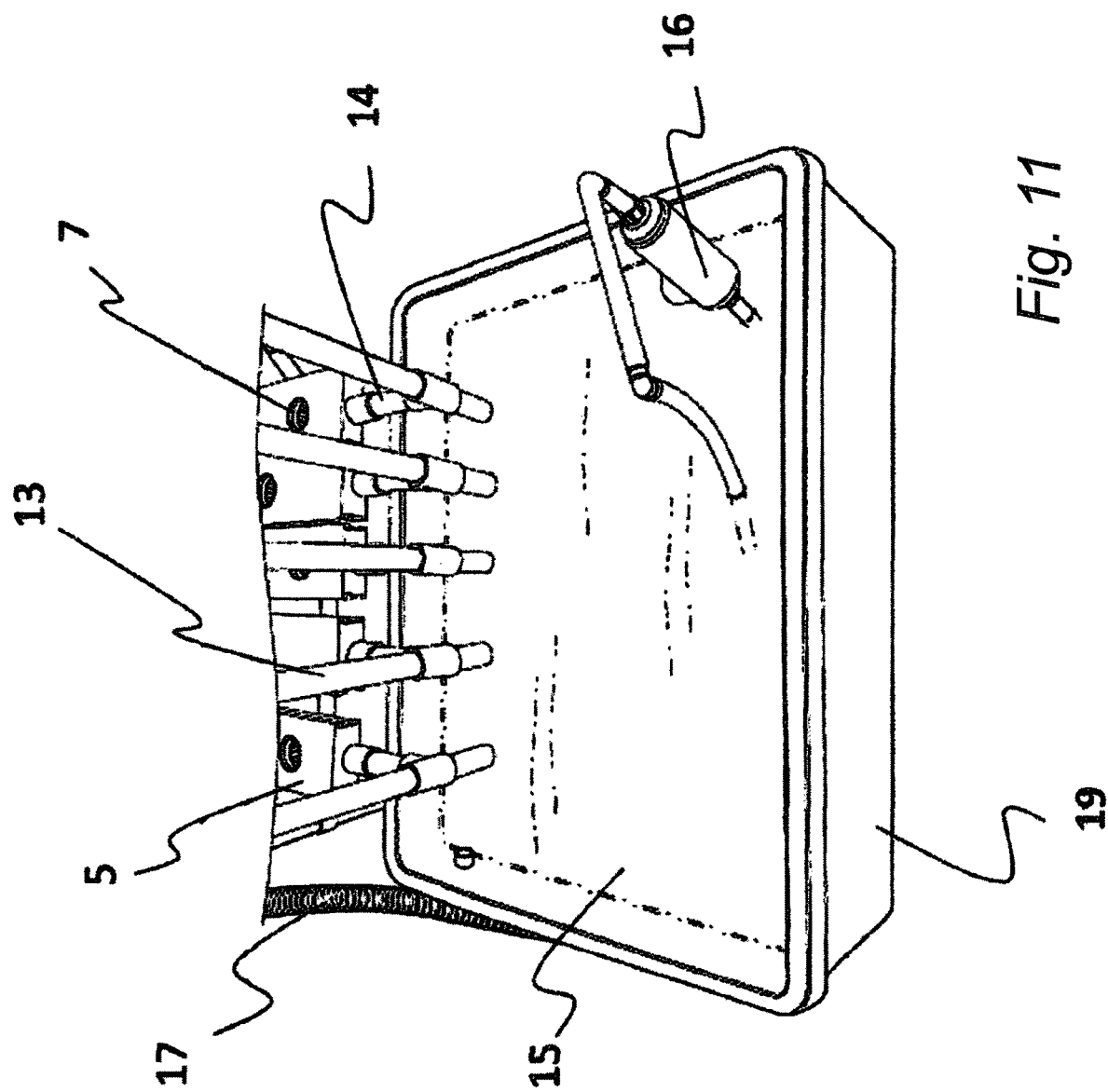
FIG. 11 is a perspective view of a drainage tank for use with the tiered section of FIG. 8.

Whilst the drainage tank 15 shown in FIG. 11 is shown to be width of a single section 1, it envisaged that in some embodiments the tank 15 can be elongated so that its overall length would be sufficient to accommodate sideways movement of the section 1 along the track 18 whilst retaining the ends of the drainage pipes 13 within the confines of the tank walls 19.

In an alternative embodiment the drainage tank takes the form of a single trough like structure that extends along the entire side perimeter of the track, but, again, beneath the hollow floor system, such that the drainage pipes 13 of each section remain within the confines of the walls of the trough, even when a section is moved to the extremity of the track. An example of this is described later on.

Figure 13:
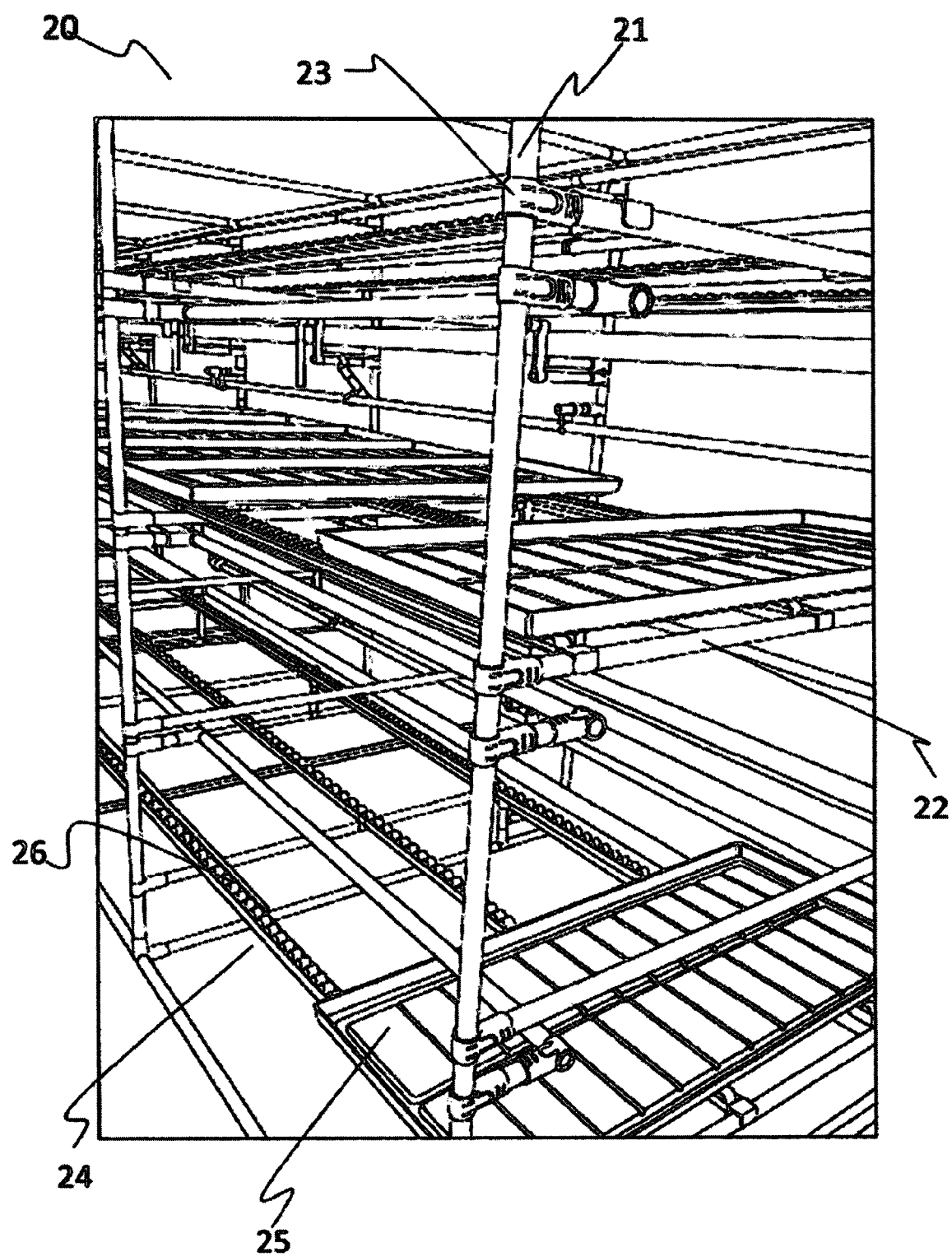
FIG. 13 is a perspective view of a vertical tiered section forming part of a vertical growing system constructed in accordance with a second embodiment present invention.
Figure 14:
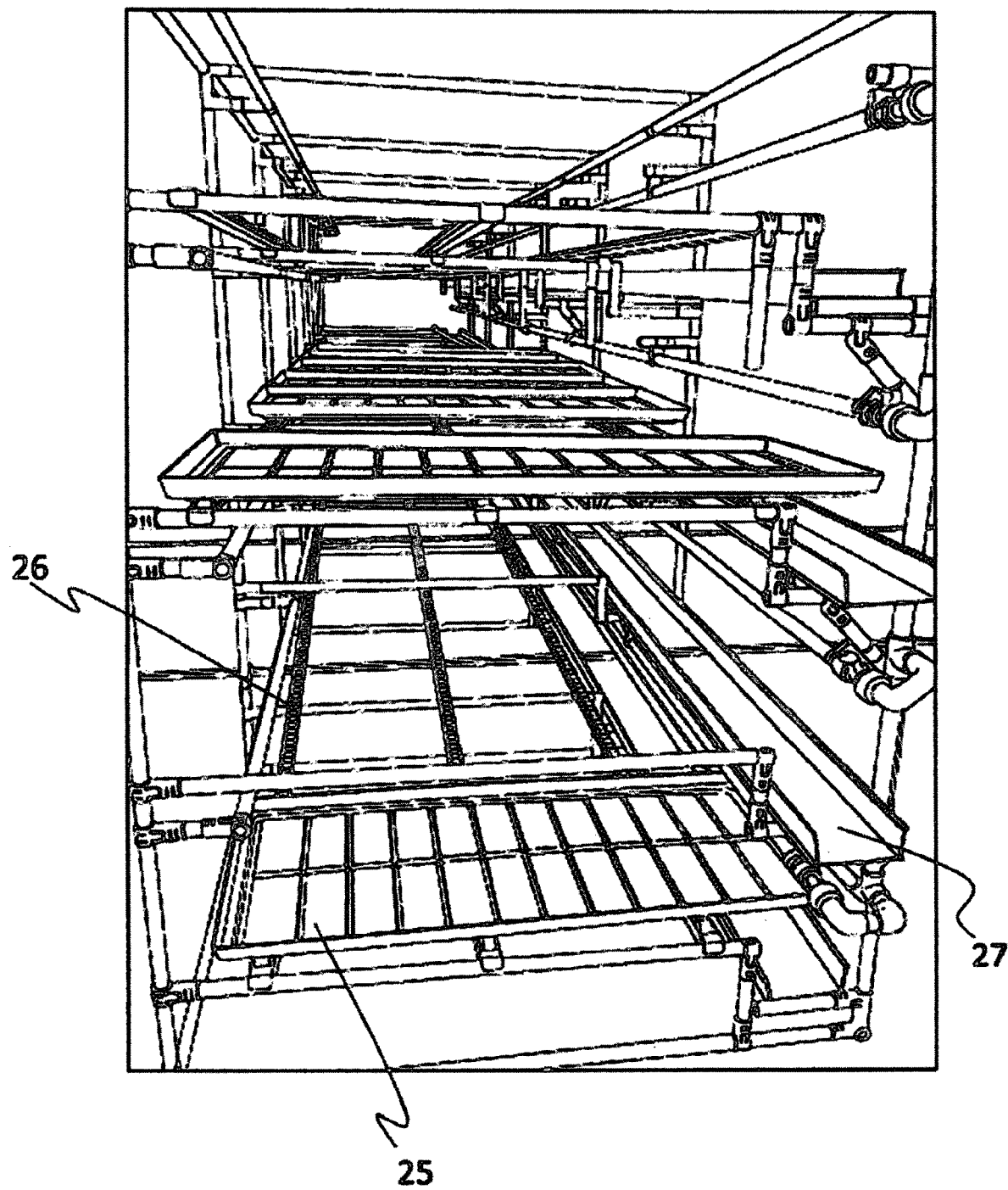
FIG. 14 is an end view of the tiered section of FIG. 13.

FIGS. 13 and 14 illustrate a different tiered section 20 for use in a vertical drainage system, this time working on the flood and drain principle. In flood and drains systems, sometimes known as ebb and flow, the entire root zone is periodically flooded with nutrient solution before it dries out. This is done with a timer on a pump from a main nutrient tank usually located directly below the flood tray. The root zone is flooded for short periods of time (between 10-15 minutes). The interval between floods will depend on plant size and medium used (stone wool or expanded clay pebbles). As with the embodiment previously described, the overall system would include a plurality of such sections. The section 20 comprises a framework of interconnecting vertical and horizontal beams (21 and 22 respectively). The framework beams 21, 22 are constructed from aluminium or other suitable strong but lightweight material.

The horizontal beams 22 are connected to the vertical beams 21 through jointed clamps 23, the height of which can be altered to lower or heighten any tier level within the section 20.

Three elongate supporting arms 24 extending longitudinally through the section 20 at each tier level. The arms 24 provide supports for plant trays 25 which extend perpendicularly across the framework at each tier level.

Each arm 24 is provided with a roller mechanism 26 extending along the entire length of each arm 24 such that the trays 25 can be easily dragged along the longitudinal axis of the section 20 from one end to the other. The trays 26 may be manually moved along the rollers 26 or the movement may be automated.

As can be seen best in FIG. 14, drainage channels 27 extend along the length of one side of the section 20. The drainage channels 27 provide a path for flow of nutrient from the tray after it has been flooded, during the drainage stage. The end of the drainage channels extend over an aperture, or multiple apertures, in the floor system, over one or more drainage tanks (not shown).

Like in the first described embodiment of the growing system, the section 20 is one of several within the system that is secured to a floor track allowing movement of the sections 20 to open and close walkways therebetween as has previously been described.

Like with the first described embodiment, the lighting and nutrient systems for any given section 20 are carried on that section 20 such that any given section 20 can be moved along the track without the need for disconnection of the systems thereby allowing that section to be moved during the growth cycle of the plants.

The vertical tiered sections described above are designed for use in an overall system comprising a number of such sections and a floor track on which each section is mounted. The system would also include means to connect the centralised fluid and electricity supplies to the nutrient and lighting assemblies of each section.

Figure 17A:
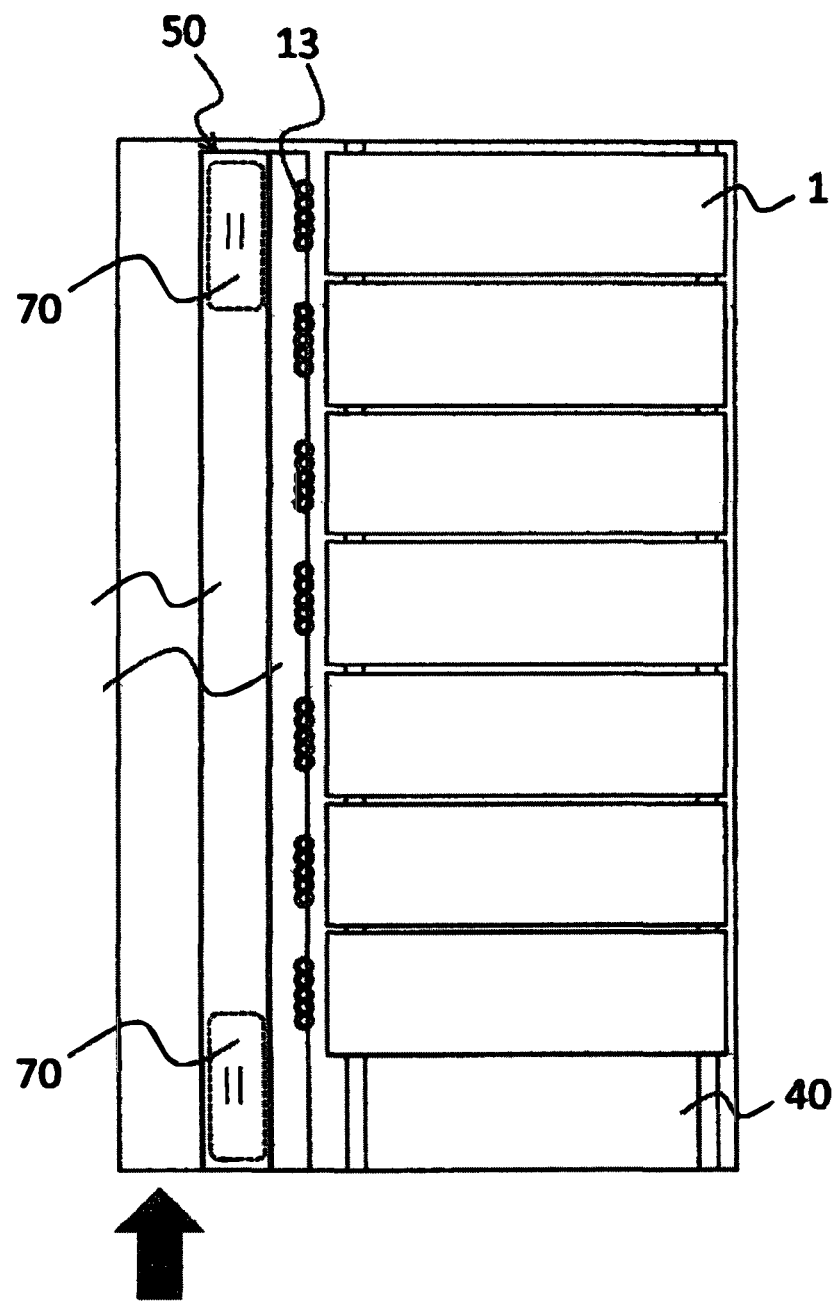
FIGS. 17(a) and (b) are schematic illustrations showing the water tank of the system.
Figure 17B:
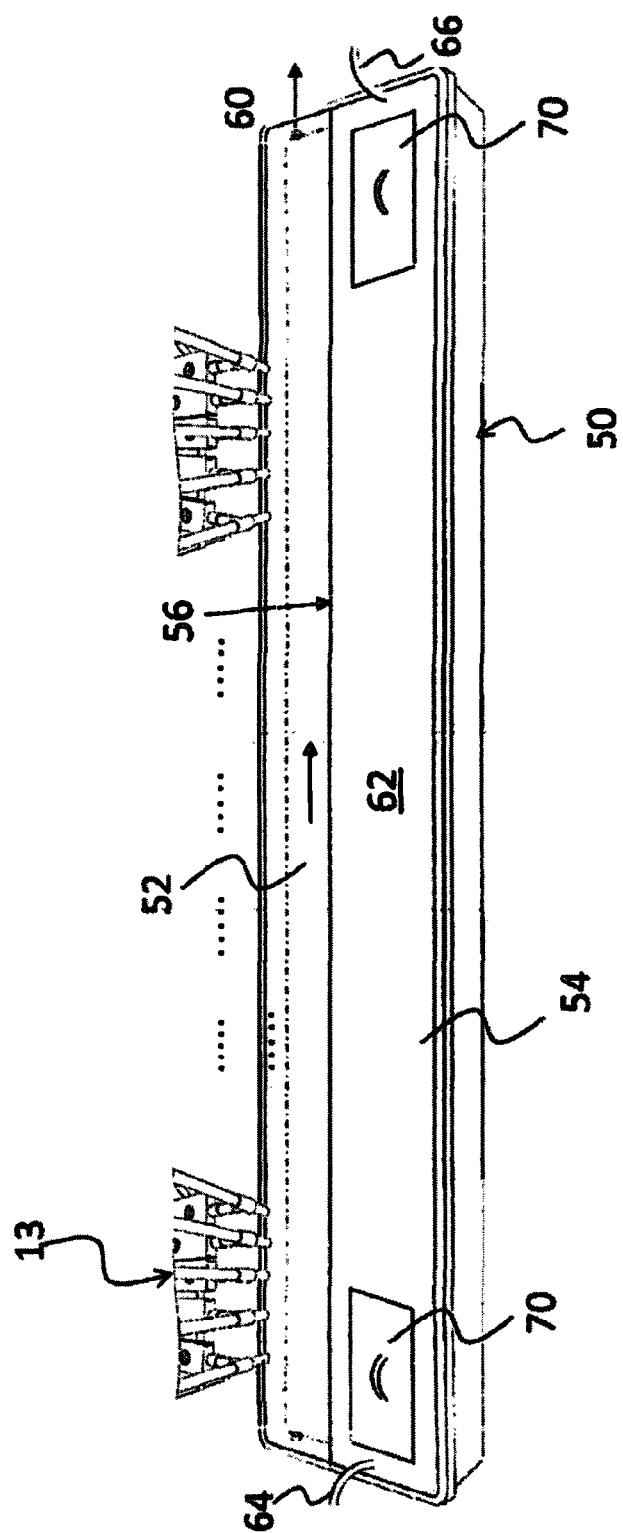
Figure 19:
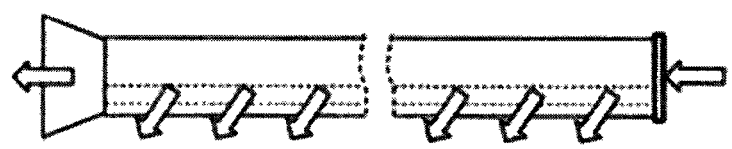
FIGS. 18 and 19 are schematic illustrations showing the use of an air duct sock within the system.
Figure 18:
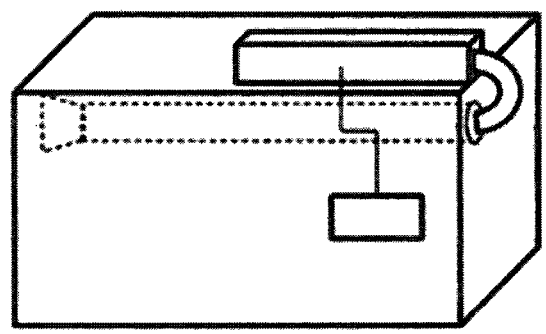
Figure 20:
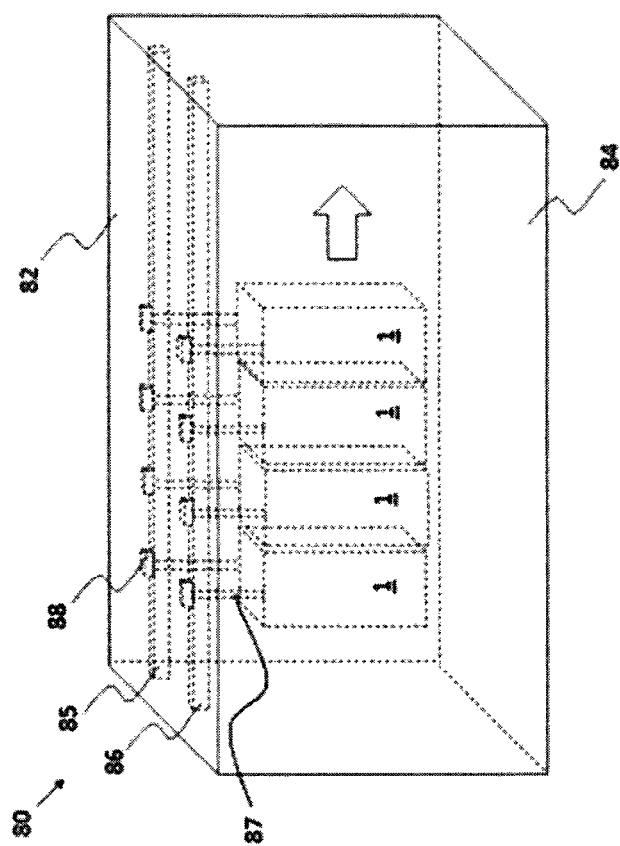
FIG. 20 is a perspective view of a growing structure employing rails mounted above the growing sections according to an embodiment of the present invention.
Figure 21:
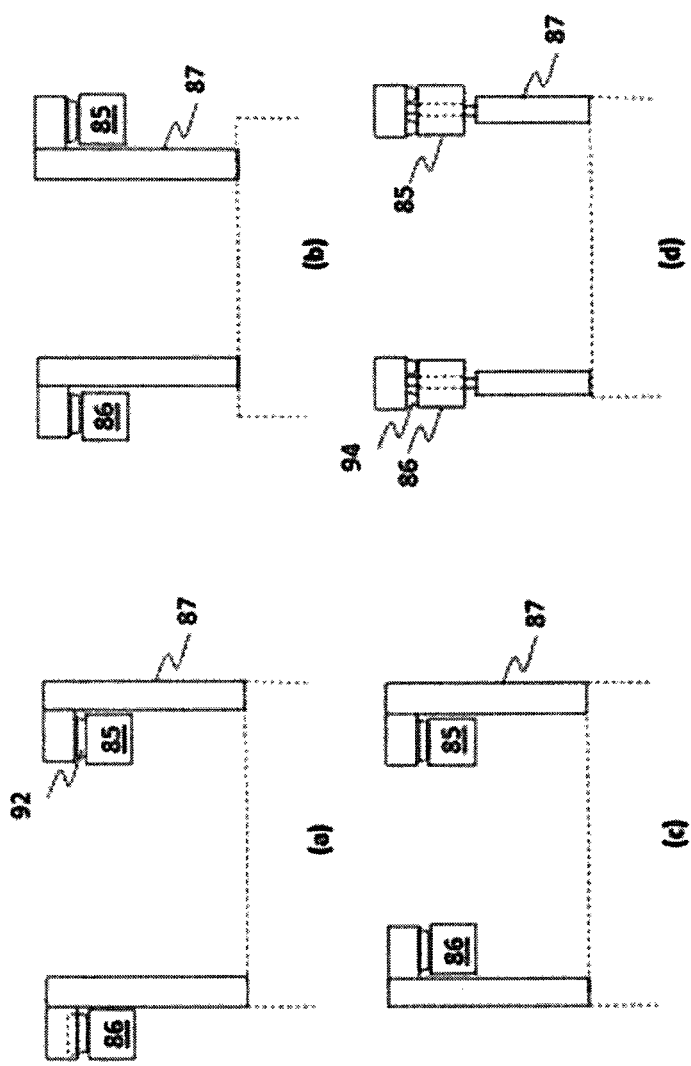
FIGS. 21(a) to (d) show in plan view different variations of how a section may locate on rails above.
Figure 22:
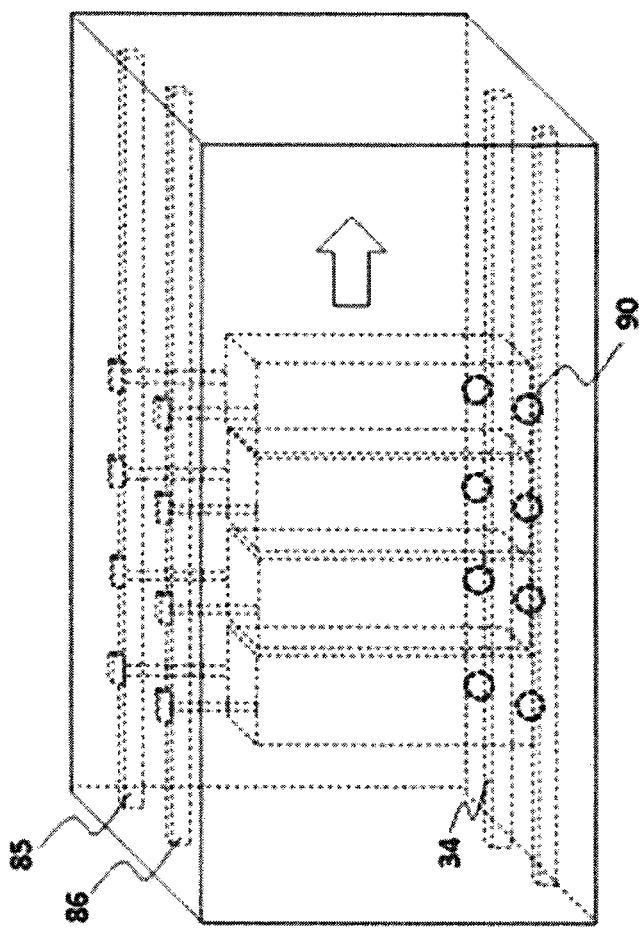
FIG. 22 is a perspective view of a growing structure with rails both above and below growing sections according to a further embodiment of the invention.
Figure 23:
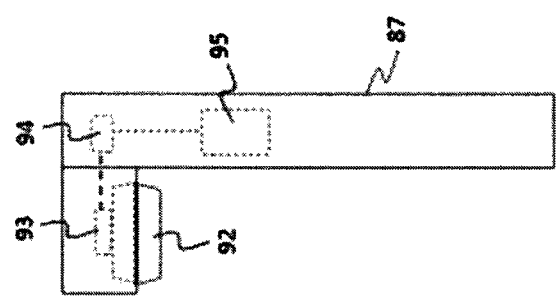
FIG. 23 is a plan view of one upwardly extending arm, showing an electrical drive system located within the arm for driving the roller on a rail.

Referring to FIGS. 17(a) and 17(b), there is now described an example of the above-mentioned elongated tank. The tank 50 has a length, in this case, that extends substantially the length of side-by-side sections 1 as well as extending along the gap 40. The tank 50, sits within the hollow part of the floor system, i.e. beneath its upper surface, beneath an elongated aperture. The drainage pipes 13 of each section 1 (shown in section) are supported overhanging the tank 50 so that fluid exiting the lower ends drains into the tank, and the aforementioned sideways movement of the sections does not result in spillage. Indeed, the overhanging pipes 13 can be level with, or below, the upper perimeter wall of the tank 50 to minimise splashing.

The FIG. 17 tank 50 is also different in that it is divided into two distinct liquid-carrying parts, namely a drainage portion 52 and a fresh liquid portion 54 divided by an intermediate lengthwise wall 56. The drainage portion 52 has a sloping floor in order to urge using gravity the collected liquid towards one end where it can be removed from the tank 50, whether permanently, or for processing by a filtering/recycling system. The flow of draining liquid is indicated by the arrows to an exit aperture 60. The fresh liquid portion 54 is covered by a top wall 62; liquid is fed-in from a mains or other source through an inlet pipe 64 and exits as and when required through outlet pipe 66 which is connected to a pump that transmits the liquid to the individual sections 1. The incoming liquid may be fresh water or nutrient-containing liquid. Inspection covers 70 are provided to enable access to the fresh liquid portion 54, whether for checking levels and/or adding chemicals. Thus, both drainage and fresh liquid storage is enabled in a combined, compact and convenient unit within the growing room 30. The tank 50 is relatively lightweight, being preferably made from plastics material, although any suitable material can be used.

Further, in some embodiments, an air sock duct (hereafter "sock") can be provided in the growing room 30. Referring to FIG. 11, a sock 72 is shown attached to a wall mounting 74 through which air of a predetermined temperature is delivered from a low-velocity fan delivery system. The sock 72 is formed of fabric (or similar flexible) material which has a length that extends substantially the length of the room 30; it serves to evenly distribute air within the room, with micro-perforations diffusing the air and preventing draughts. FIG. 12 indicates where the sock 72 can be located in the growing room 30, e.g. above the side walkway, with the air delivery system 80 located on the external roof to maintain a compact footprint. The delivery system 80 is connected to the sock 72 by a duct 82, and controlled from a control unit 84 mounted to the side wall. As shown in FIG. 11, the perforations in the sock 72 can be arranged along one side to direct air substantially evenly towards the tiered sections, as indicated in FIG. 13.

The system would be located within a building specifically designed with strict temperature and climate controls to provide optimum conditions for plant growth. The buildings may be prefabricated units constructed on-site. The individual maneuverability of the tiered sections within the system allow the footprint of the unit to be only a little larger than the combined footprint of the sections with only a little extra width required to form a pathway between selected sections when necessary.

Referring now to FIGS. 14 to 16, there will now be described embodiments in accordance with the invention, which employ one or more rails located above the sections 1 of the vertical tier growing system.

Referring to FIG. 14, in an enclosed growing structure 80 is provided a pair of rails 85, 86 mounted to or just beneath a ceiling 82 of the structure 80. The rails 85, 86 extend along the longitudinal extent of the structure. The above-mentioned sections 1 of the growing system are in this case held beneath the rails 85, 86 (without the need for rollers or casters, and therefore the track) by means of a pair of upwardly extending arms 87 either side of the sections. At the distal end of the arms 87 are provided respective rollers, castors or sliders 88 which locate over the top of respective rails 85, 86 to enable the sections to move therealong in the manner indicated in the previous Figures, and for the same purpose. By obviating the need for ground-mounted tracks and the lower rollers, as in previous Figures, more space is created under each section for access and/or providing other components. In effect, the sections 1 hang from the upper rail(s).

As shown in FIGS. 15(a) to (d) there are various mechanisms by which the rollers 88 can locate on the rails 85, 86. In FIG. 15(a), for example, the arms 87 extend to the same side of each rail 85, 86. In FIG. 15(b), the arms 87 extend within each rail 85, 86. In FIG. 15(c), the arms 87 extend outside each rail 85, 86. In FIG. 15(d), each rail 85, 86 is slotted down its centre, so that the arms 87 extend through the central slot with the a pair of rollers 94 located either side of the slot. Having pairs of adjacent rollers improves stability.

Referring to FIG. 16, in addition to using upper rails 85, 86, the floor-mounted rails or tracks 34 previously described can also be provided, so that the system uses both upper and lower rails for increased stability.

In all embodiments, a friction brake system can be associated with each section 1, i.e. so that the wheels, rollers or castors on each can be braked with respect to the rails to selectively fix its position temporarily.

In all embodiments, a motor can be associated with each set of wheels, rollers or casters, or at least one of which on a given section 1, to permit driving of a section along the rail (whether upper or lower) and which may be selectively controlled using a remote controller to get to the required position.

FIG. 17 shows one example implementation of a motor driven system. Adjacent the roller 92 is a drive roller 93 which abuts the roller 92 to cause rotation in sympathy with rotation applied by a motor 94 through an interconnecting shaft. The motor 94 is controlled electrically by a control system 95 which may receive user inputs to start/stop the rotation, and control direction of rotation, through a wired or wireless controller. Of course, a drive system of this sort is not essential. Movement of the sections 1 can be done manually by user action. The FIG. 17 system can alternatively be representative of a friction brake, whereby element 93 represents a moveable brake pad which moves into contact with roller 92 in response to mechanical or electrical input to element 95, e.g. through a pull cable or lever.

The above-described vertical tiered growing system may be adapted to hang from the roof rails 137 as indicated in FIG. 7, by means of vertically extending arms onto which are mounted rollers, sliders or casters. The same ability to move the sections 1 relative to one another is achieved, without the need to provide track rails on the floor system, although in theory both systems can be provided.

A hydroponic growing method will now be described with regard to a "flood and drain", or "ebb and flow", setup employing particular apparatus.

Referring to FIG. 24, a plant tray 100 is shown, comprising a metal or plastics sheet having a generally planar upper surface 101 and a lower surface 102. Within the upper surface 101 are formed a plurality of recesses 103, sunken into said surface, and can be of any shape or size, although circular recesses are shown herein. The recesses 103 define individual growing areas for receiving seeds, or germinating seeds. The recesses 103 in this case project beyond the lower surface 102 but in other embodiments can be shallower so that the lower surface remains substantially planar.

FIG. 25 shows one recess 103 in cross-section, within which is placed a growing substrate 105, e.g. rock wall or a biodegradable fibrous material, e.g. biodegradable carpet. A seed 107 is typically buried within the substrate 105, or can be placed on or below it, and the substrate is moistened. The substrate 105 provides support for the roots as the seed germinates. It is often an inert material. In this case, individual disc-like substrates 103 are placed into each recess 103, but in other embodiments, a larger sheet can be laid over multiple recesses, with a seed placed in each recess location.

Figure 26:
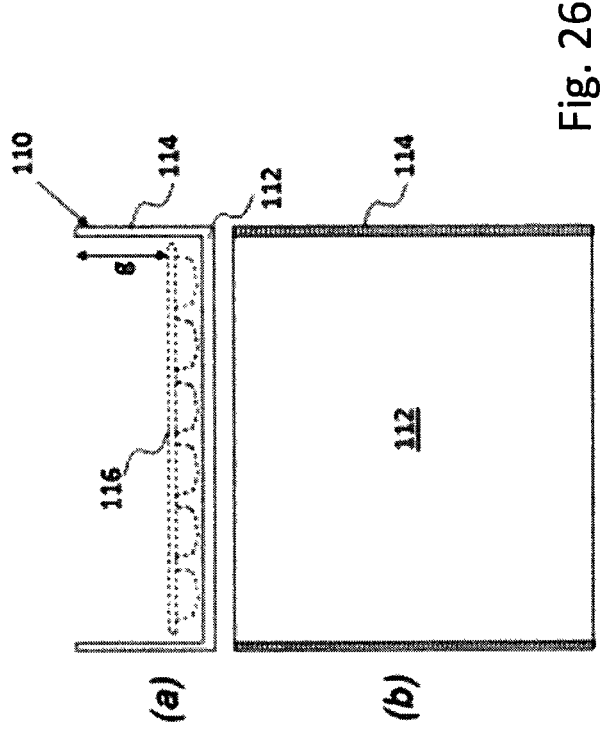
FIGS. 26a and 26b are side and top plan views of a stacking tray for use in the method according to the invention.

Referring to FIGS. 26a and 26b, a stacking tray 110 is shown having a base 112 and two upstanding walls 114 on opposite sides of the base to provide a generally U-shaped structure. In other embodiments, four walls are provided, i.e. to surround the base 112, and only a single wall might be used if circular. The internal surface area of the base 112 is shaped and dimensioned to be greater than that of the plant tray 100. The stacking tray 110 may be formed of metal, plastics or indeed any material. The height of walls 114 is approximately identical on both sides and greater than the depth of the plant tray 100 as indicated by the dotted lines. Accordingly, the plant tray 100 when located on the base of the stacking tray 110, as shown in phantom lines in FIG. 26, leaves a gap "g" between its upper edge and the upper extent of the walls 114.

Figure 27:
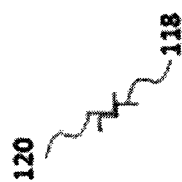
FIG. 27 is a partial sectional view showing an optional engagement system between stacking trays when placed one on top of the other.

In the method, multiple stacking trays 110 are placed one on top of the other in a vertical stack. The base 112 of one therefore rests on the upper edges of the walls 114 of the one beneath. In other embodiments, the stacking trays 110 may be slightly trough-shaped, or, as indicated in FIG. 27, have cut-outs 118 near the upper ends for receiving an appropriately-shaped base part 120 of the other stacking tray in order to limit lateral movement when stacked.

Figure 28:
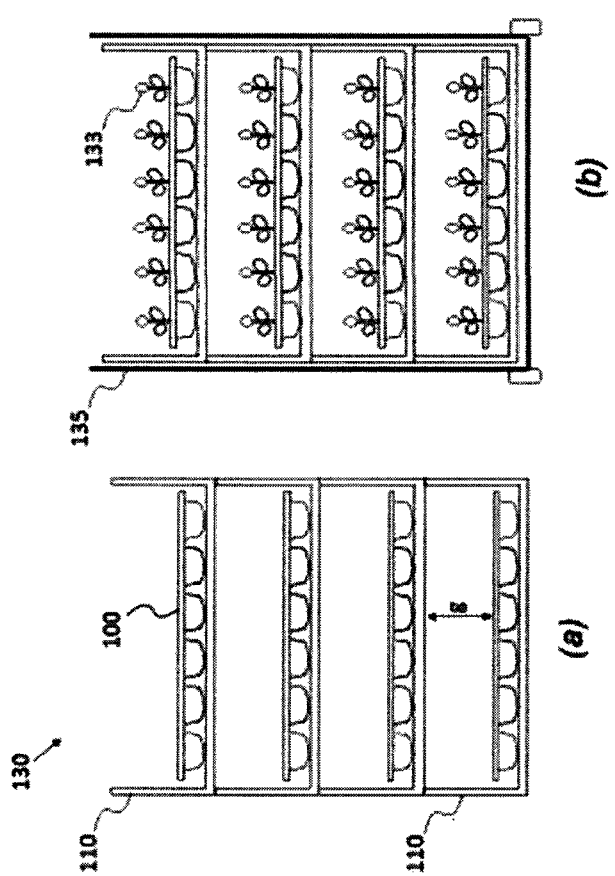
FIGS. 28a and 28b are side views of a stack of stacking trays before and after a growth period.
Figure 29:
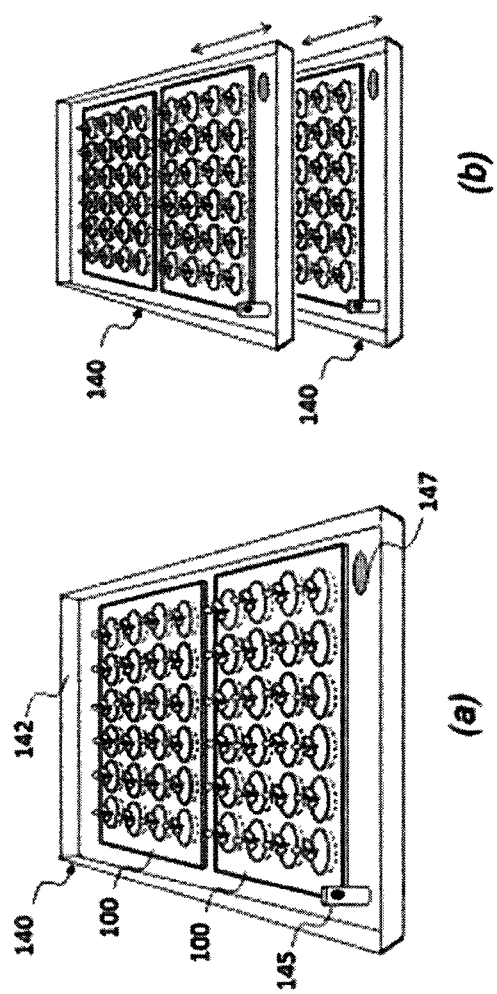
FIGS. 29a and 29b are perspective views of the plant trays when removed from their respective stacking tray and placed on, respectively, a flooding table, and tiered flooding tables.

In the present growing method, the seeds 107 and substrate 105 are placed in respective recesses 103 of the plant tray 100. The plant tray 100 is placed in a stacking tray 110, as indicated in FIG. 26. The process is repeated with other plant and stacking trays 100, 110 which are stacked, one on top of the other, as shown in FIG. 29. The stacked tiers 130 are then placed in a growing room or other suitable environment to promote germination for a given initial time period. In this period, the gap "g" between the various sections allows upwards growth without interference from the upper level, and overall the stack 130 allows a greater number of plants to be catered for in a given floor footprint. See FIG. 28b, showing how the plant 133 is not affected. Also, the stack 130 can be placed on a trolley 135 or the like for easy transportation to and from the growing room.

After the initial growing period, the stack 130 is moved to a flood and drain growing apparatus, or alternatively, each section of the stack 130 can be moved individually. Referring to FIG. 39a, this generally comprises a flood table 140, being a bath with raised edges 142. A pump (not shown) is configured to flood the table 140 with a predetermined volume of nutrient liquid through an inlet 145. The volume is such as to just cover the depth of a plant tray 100 when located on the table 140 to provide nutrients to the plants 133, after which the pump ceases delivery. After a predetermined period subsequent to flooding, a drain 147 is opened to drain the liquid to a tank underneath (not shown) using gravity. Alternative flood and drain mechanisms and arrangements may be used.

As shown in FIG. 39a, the flood table 140 may be dimensioned to receive multiple plant trays 100. Rollers (not shown) may be provided in the lower part of the flood table 140 to allow plant trays 100 to be moved over the table easily. FIG. 29b shows a vertical tiered system employing multiple flood tables 140, one on top of the other, which in use may be supplied with water from a single pump and drained to a single tank for recycling and/or filtering and replenishment in a feedback cycle.

The "flood and drain" process is typically repeated for a further growing period depending on the stage of plant growth. The process is usually controlled using an electronic timer system which starts and stops the pump, and opens and closes the drain 147, in accordance with settings or a program. UV light may also be used in conjunction with the flood table 140 during this growth stage.

Again, the use of tiered flood tables limits floor space.

Figure 30:
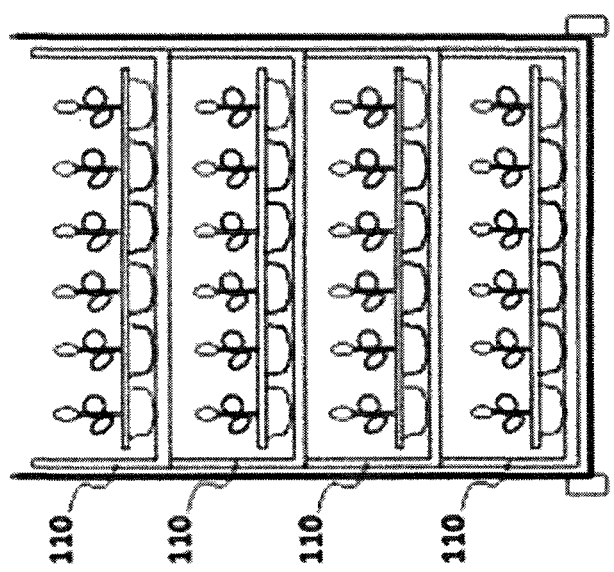
FIG. 30 is a side view of the stack after a flood and drain cycle.

At the end of the "flood and drain" stage, the plant trays 100 are again placed within a respective stacking tray 110 and stacked one on top of the other as shown in FIG. 30. The gap "g" is sufficient still to allow for the increased growth without interference. The stack can then be transported for storage and/or packing for onwards sale or transportation to customers.

The base of the plant trays 100, including the recesses 103, is closed, i.e. there are no drainage holes, to maintain moisture in the substrate 105 and prevent dripping when moving the trays 100 to the stacking trays 110. Similarly, the stacking trays 110 may have a closed base 112.

Overall, it will be apparent from the foregoing that large numbers of plants can be grown, over a given footprint area, and can be transported in bulk between, locations, e.g. growing rooms and flood tables. Further advantages are provided by performing the given method in association with a vertical tier growing apparatus, e.g. as described in WO2015140493 the entire contents of which are incorporated herein by reference. For completeness, we discuss this apparatus, and variations thereof, in the following.

It will be appreciated that the foregoing is merely descriptive of example embodiments of this invention and that modifications can readily be made to these embodiments without departing from the true scope of the invention as set out in the appended claims.

The invention claimed is:

1. A portable growing apparatus, comprising:
   a pre-fabricated, collapsible housing structure which, when constructed at the point of use, provides an enclosed growing area surrounded by one or more enclosing walls; and
   a growing system formed of a plurality of detachable parts for assembly at the point of use and for locating within the enclosed growing area of the collapsible housing structure;
   a pre-fabricated floor structure dimensioned to be housed within the enclosed growing area of the collapsible structure when constructed, which floor structure comprises a substantially flat floor surface having one or more openings or apertures for pipes to extend in use from the growing system above the floor structure to a location beneath the floor structure, wherein the floor structure comprises, beneath the floor surface, one or more insulated walls.

2. The apparatus according to claim 1, wherein the housing structure comprises:
   a framework comprising one or more rigid or relatively rigid frame sections; and
   one or more panels arranged in use to be connected to, and supported by, the framework at the point of use to provide the enclosing walls within which is defined the growing area.

3. The apparatus according to claim 1, wherein the floor structure comprises, beneath the floor surface, one or more tanks for holding liquid.

4. The apparatus according to claim 3, wherein each tank is integrally formed with the floor structure.

5. The apparatus according to claim 3, wherein the floor structure comprises means for mounting one or more liquid pumps and/or a power supply.

6. The apparatus according to claim 1, wherein the floor structure comprises one or more rails on its upper surface for relative sliding or rolling movement of different section(s) of the growing system.

7. The apparatus according to claim 6, wherein the growing system is a vertical, tiered growing system having multiple sections, each being movable relative to one or more other sections by means of rollers, sliders or casters which locate on the rail(s).

8. The apparatus according to claim 1, further comprising one or more detachable rails for mounting between the walls of the collapsible structure, above ground level, and to which the growing system is mounted in use so as to require no ground support.

9. A portable growing apparatus, comprising:
   a pre-fabricated, collapsible structure having a plurality of walls which, when constructed at the point of use, define an enclosed interior area;
   a vertical growing system formed of detachable parts, for construction at the point of use and which, when constructed, is dimensioned to be enclosed within the interior area of the structure, the vertical growing system comprising:
      (i) a plurality of tiered sections, each section being a framework for mounting multiple growing trays or growing channels, one above the other,
      (ii) a liquid source for supplying a liquid to each tiered section individually, and
      (iii) a power source for supplying electrical power to individual lighting sources associated with each tiered section; and
   one or more mounting rails for locating within the enclosed interior area, to which each tiered section is mounted in use so as to be movable along the rail(s) relative to other section(s).

10. The apparatus according to claim 9, wherein the one or more mounting rails are configured to be connected above ground, closer to an upper wall/roof of the collapsible structure than the ground, from which each of the tiered sections in use hang.

11. The apparatus according to claim 9, wherein the one or more mounting rails are provided on a pre-fabricated floor dimensioned to locate within the enclosed area.

12. The apparatus according to claim 11, wherein the pre-fabricated floor further comprises one or more channels or tanks provided beneath, each having an aperture through the floor for access thereto.

13. A method of providing a growing system, comprising:
   providing a pre-fabricated, collapsible structure, in collapsed form;
   providing a growing system formed of a plurality of detachable parts, in detached form;
   constructing the structure to provide an enclosed growing area;
   constructing the growing system and locating same within the enclosed growing area; and
   extracting ground material from within the enclosed area to provide a ground recess or hole, locating a floor structure over the recess or hole, locating the growing system on the floor structure, and providing beneath the floor structure one or more of a liquid drainage tank, liquid supply tank, drainage pump, supply pump and/or electrical power supply so that it is at least partially within the recess or hole.

* * * * *